US012636792B2

(12) United States Patent
Li et al.

(10) Patent No.: US 12,636,792 B2
(45) Date of Patent: May 26, 2026

(54) CONTAINERIZED ROBOTIC SYSTEM

(71) Applicant: Dexterity, Inc., Redwood, CA (US)

(72) Inventors: Joseph Li, San Jose, CA (US); Robert Moreno, East Palo Alto, CA (US); Cuthbert Sun, San Francisco, CA (US); Salvador Perez, Jersey City, NJ (US); Neeraja Abhyankar, Menlo Park, CA (US); Arth Beladiya, Santa Clara, CA (US); Kunal Vikas Shinde, Santa Clara, CA (US)

(73) Assignee: Dexterity, Inc., Redwood City, CA (US)

( * ) Notice: Subject to any disclaimer, the term of this patent is extended or adjusted under 35 U.S.C. 154(b) by 130 days.

(21) Appl. No.: 18/368,941

(22) Filed: Sep. 15, 2023

(65) Prior Publication Data

US 2024/0091952 A1     Mar. 21, 2024

Related U.S. Application Data

(60) Provisional application No. 63/407,574, filed on Sep. 16, 2022.

(51) Int. Cl.
B25J 9/16 (2006.01)
(52) U.S. Cl.
CPC ........... B25J 9/1697 (2013.01); B25J 9/1674 (2013.01)

(58) Field of Classification Search
CPC ...... B25J 9/1697; B25J 9/1674; B25J 9/1692; G05B 2219/39058; G05B 2219/40304; G05B 2219/40615; G05B 2219/45063
See application file for complete search history.

(56) References Cited

U.S. PATENT DOCUMENTS

| | | | | |
|---|---|---|---|---|
| 9,457,970 | B1* | 10/2016 | Zevenbergen | ......... B25J 9/0093 |
| 2019/0357986 | A1* | 11/2019 | Morgan | ................. A61B 17/88 |
| 2022/0111516 | A1* | 4/2022 | Yeap | ..................... G05D 1/0055 |
| 2022/0147026 | A1* | 5/2022 | Poelman | ................ B25J 9/1671 |
| 2022/0379474 | A1* | 12/2022 | Vu | .......................... G01S 17/87 |
| 2023/0069565 | A1* | 3/2023 | Kalouche | .............. B25J 9/1656 |

* cited by examiner

*Primary Examiner* — Dylan M Katz
(74) *Attorney, Agent, or Firm* — Van Pelt, Yi & James LLP

(57) ABSTRACT

A robotic system is disclosed. The robotic system includes (i) a robotic arm positioned in a known location adjacent to a work zone with respect to which the robotic arm is configured to manipulate one or more items, (ii) one or more sensors each positioned in a corresponding fixed location relative to the work zone, and (iii) one or more processors configured to configure the robotic system to use the robotic arm to manipulate the one or more items, the robotic system being configured based at least in part on sensor data, the sensor data comprising information indicative of a relative position of the robotic arm and one or more other objects in the work zone.

28 Claims, 34 Drawing Sheets

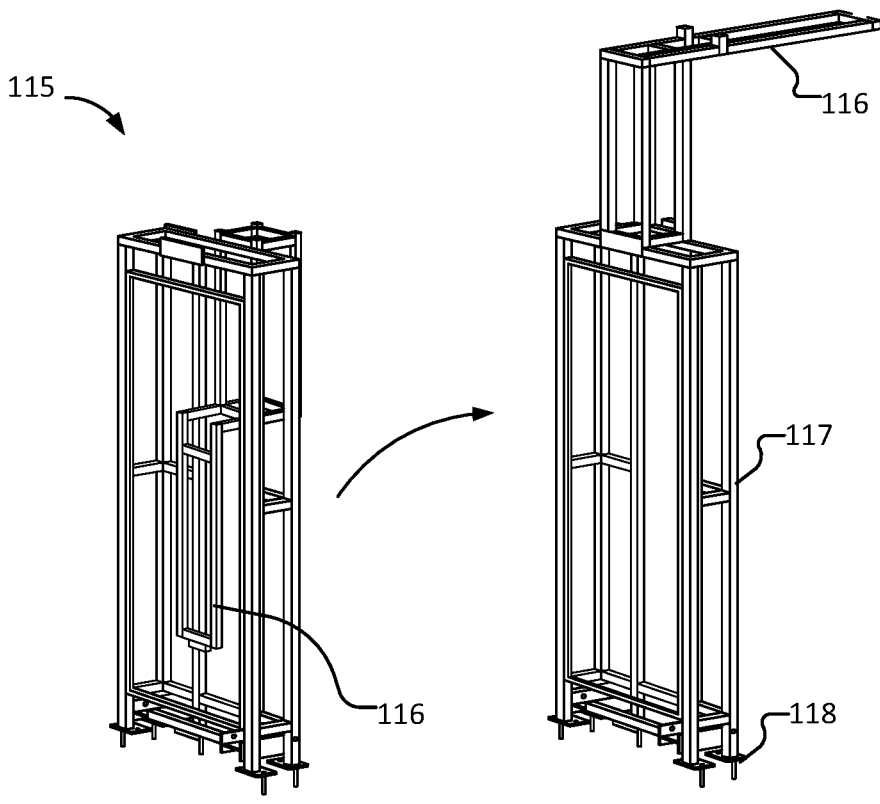
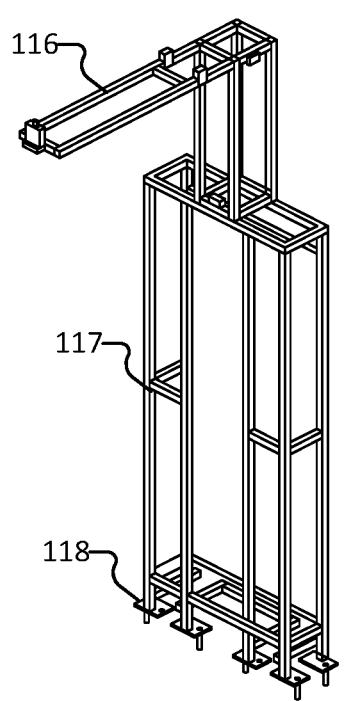
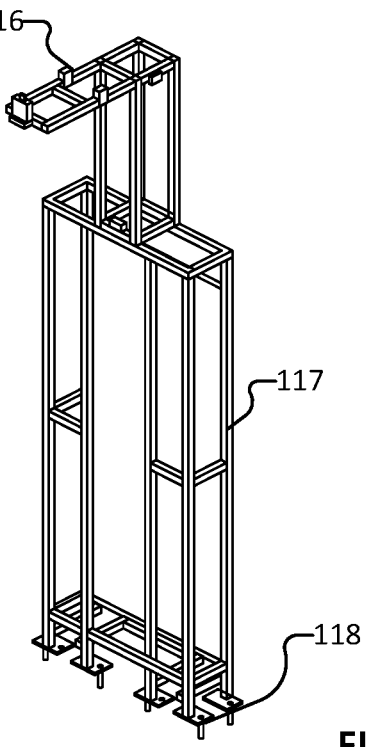
FIG . 1B

150
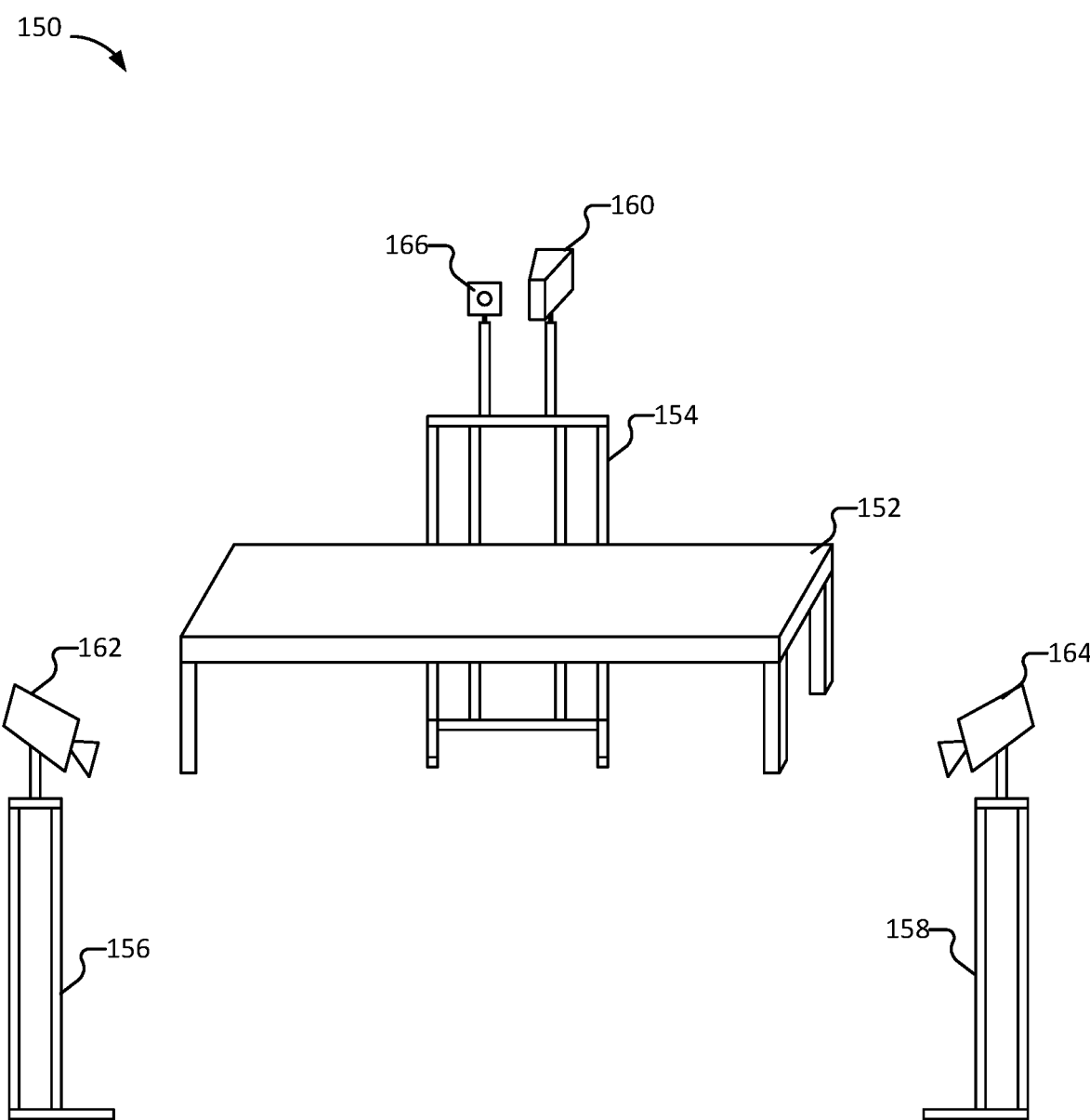
FIG ░ 1C

200

202

212

210

204

208

206

Commissioning

⊕ Back       Safety Checks

Safety ... ^

✓ Visual
Inspection

✓ Functional
Tests

FUNCTIONAL TESTS

Estop Reset

Press R E S E T button below the E S TOP button and
check the following:

On The Teach Pendant Screen, The Red ⟋ ⌒418
"E Stop" Is No Longer Displayed.

| YES |   | NO |

Stack Lights Turn to Green. ⟋ ⌒420

| YES |   | NO |

( CONFIRM )

BACK       NEXT

LAUNCH DASHBOARD

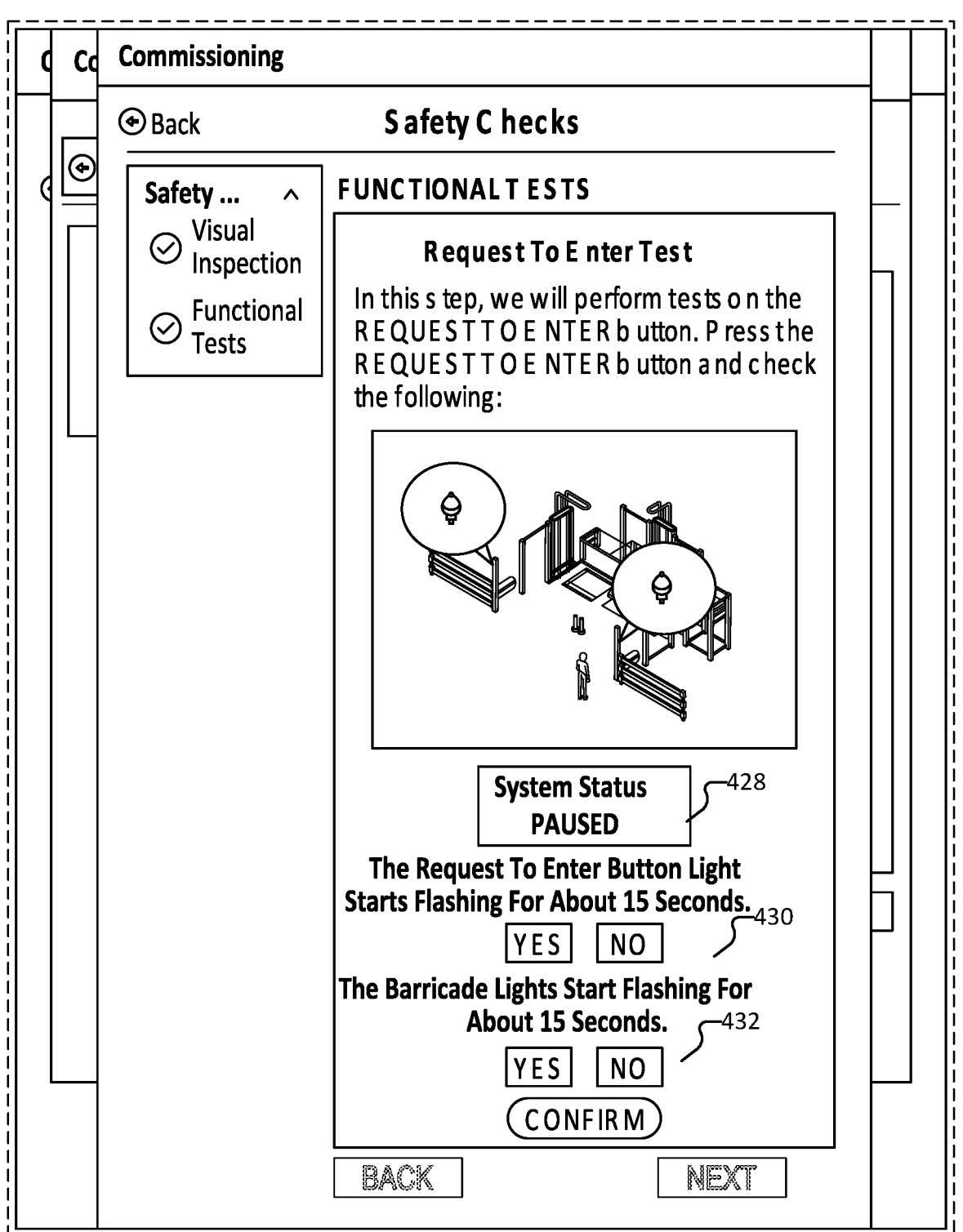

Commissioning

⊕ Back     Safety Checks

Safety ... ∧

⊘ Visual Inspection

⊘ Functional Tests

FUNCTIONAL TESTS

Request To Enter Test

In this step, we will perform tests on the REQUEST TO ENTER button. Press the REQUEST TO ENTER button and check the following:

System Status
PAUSED ⟍428

The Request To Enter Button Light Starts Flashing For About 15 Seconds. ⟍430

YES   NO

The Barricade Lights Start Flashing For About 15 Seconds. ⟍432

YES   NO ( CONFIRM )

BACK       NEXT

FIG. 4F

Commissioning

⊕ Back      Safety Checks

Safety ... ⌃
- ⊘ Visual Inspection
- ⊘ Functional Tests

FUNCTIONAL TESTS

Pallet Complete Test

In this step, we will perform tests on the scenario when one pallet is complete and requires change. Press RUN TEST to simulate the test and go to next step.

—438

( ✓ RUN TEST )

BACK      NEXT

YES   NO

About 15 Seconds.

YES   NO ( CONFIRM )

BACK      NEXT

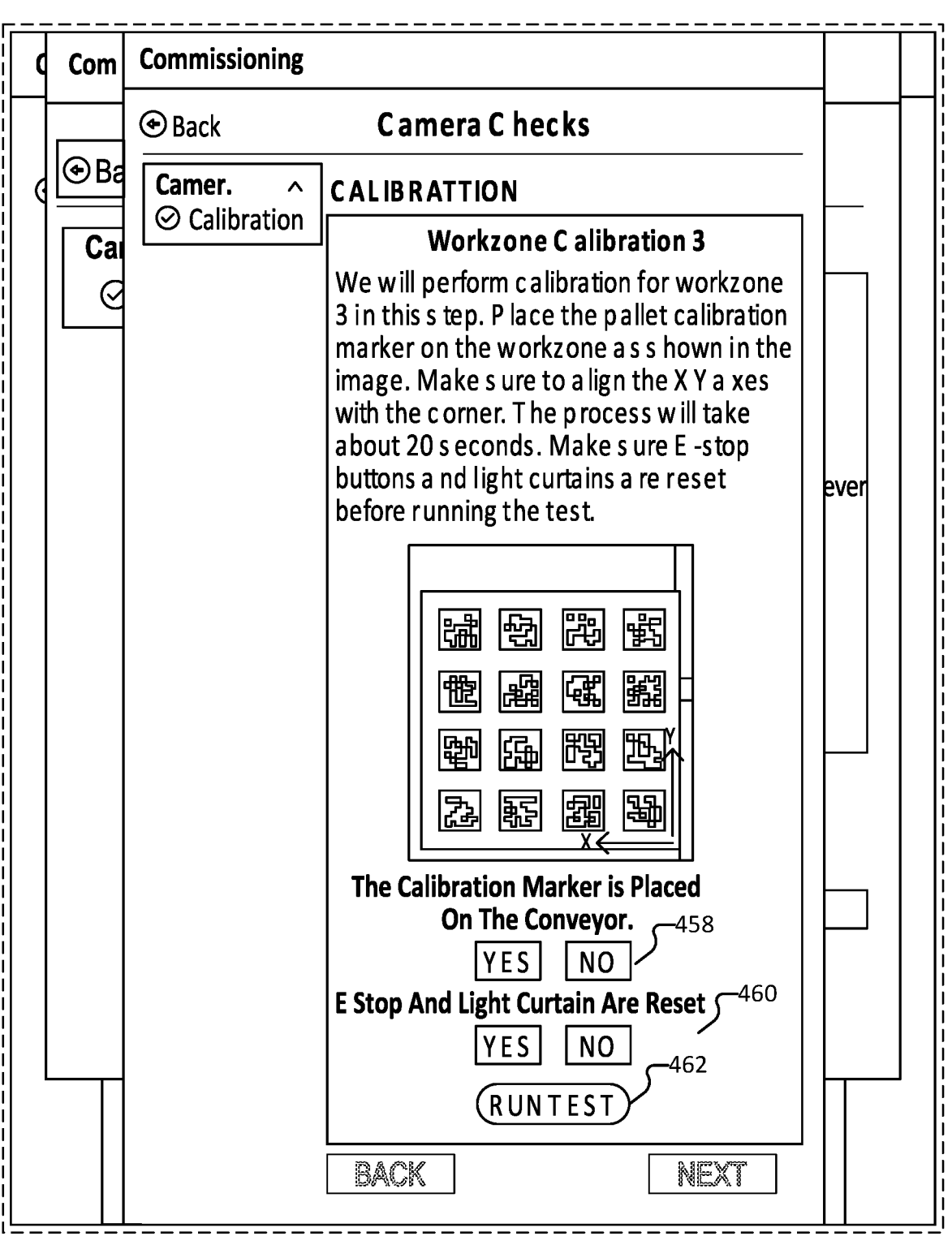

Commissioning

Back        Camera Checks

Camer.    ^
⊘ Calibration

CALIBRATTION

Workzone Calibration 3

We will perform calibration for workzone 3 in this step. Place the pallet calibration marker on the workzone as shown in the image. Make sure to align the X Y axes with the corner. The process will take about 20 seconds. Make sure E-stop buttons and light curtains are reset before running the test.

The Calibration Marker is Placed On The Conveyor. —458

YES    NO

E Stop And Light Curtain Are Reset —460

YES    NO

—462

RUN TEST

BACK        NEXT

CONTAINERIZED ROBOTIC SYSTEM

CROSS REFERENCE TO OTHER APPLICATIONS

This application claims priority to U.S. Provisional Patent Application No. 63/407,574 entitled CONTAINERIZED ROBOTIC SYSTEM filed Sep. 16, 2022 which is incorporated herein by reference for all purposes.

BACKGROUND OF THE INVENTION

Robots have been used to perform tasks in manufacturing and other fields. For example, robots have been used to perform tasks in environments that may be unhealthy or otherwise dangerous to humans, tasks that require the application of force greater than a human may be able to apply, and tasks that require a high degree of precision and consistency over time.

The deployment of robotics is burdensome in the foregoing contexts. Deployment may include assembly of a robot at the premises (e.g., the shipping and distribution centers, warehouses, shipping docks, air freight terminals, big box stores, etc.), the assembly of the workspace within which the robot is to operates, the calibration of the robot, the deployment and configuration of sensors, etc. Currently, deployment of a robot in a particular context takes on the order of forty-five days.

Robotic systems have been used to assemble kits, perform sortation and/or singulation, perform line kitting, and to stack items onto or remove items from a pallet or other receptacle.

Deployments of robotic systems to handle items in an industrial or other commercial setting are heavily involved. They take a lot of time, people resources, and are generally permanent installations. System components and peripheral equipment may arrive separately. Installation crews and robotics engineers typically are required to assemble, configure, test, and certify components and the entire system.

Typically, frames, gates and other support structures and subsystem of an industrial robotic system are large and interconnected in such a way that they cannot easily be preassembled and prepped for easy installation.

BRIEF DESCRIPTION OF THE DRAWINGS

Various embodiments of the invention are disclosed in the following detailed description and the accompanying drawings.

FIG. 1B is a diagram illustrating a frame comprised in a containerized robotic system according to various embodiments.

FIG. 1C is a diagram illustrating a sensor system comprised in a containerized robotic system according to various embodiments.

DETAILED DESCRIPTION

Figure 1A:
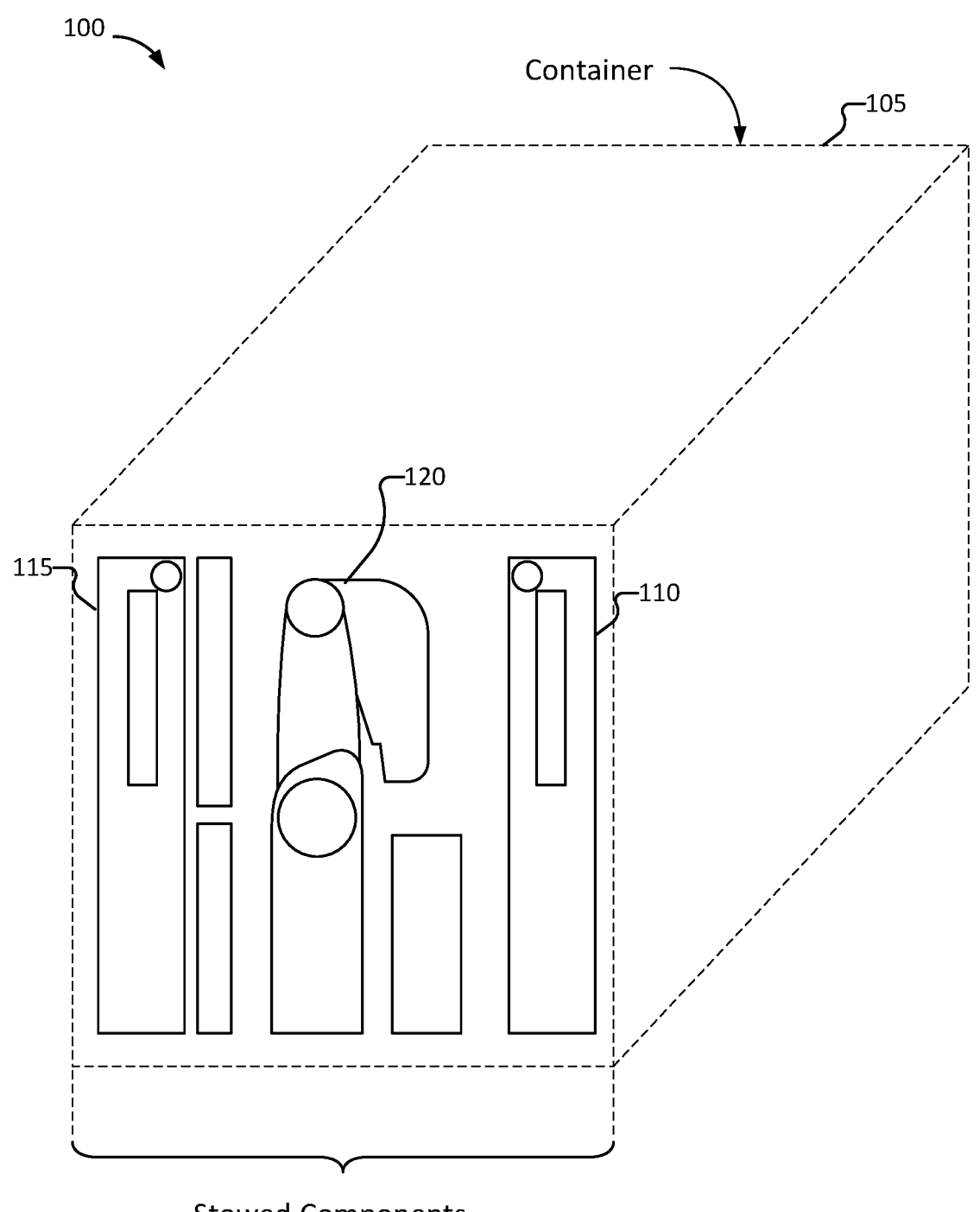
FIG. 1A is a diagram illustrating a containerized robotic system according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A robotic system is disclosed. In various embodiments, the system is a combination of a modular shippable system and a system that can deploy, commission, and calibrate by itself and/or with minimal operator prompts, and be ready to perform its task. In some embodiments, a system as disclosed herein is capable of being assembled, configured, calibrated, and operationally deployed within 2 days.

Various embodiments provide a robotic system. The robotic system includes (i) a robotic arm positioned in a known location adjacent to a work zone with respect to which the robotic arm is configured to manipulate one or more items, (ii) one or more sensors each positioned in a corresponding fixed location relative to the work zone, and (iii) one or more processors coupled to a user interface device, the processor being configured to configure the robotic system to use the robotic arm to manipulate the one or more items in response to one or more user inputs received via the user interface.

Various embodiments provide a robotic system. The robotic system includes (i) a robotic arm positioned in a known location adjacent to a work zone with respect to which the robotic arm is configured to manipulate one or more items, (ii) one or more sensors each positioned in a corresponding fixed location relative to the work zone, and (iii) one or more processors configured to configure the robotic system to use the robotic arm to manipulate the one or more items, the robotic system being configured based at least in part on sensor data, the sensor data comprising information indicative of a relative position of the robotic arm and one or more other objects in the work zone. The sensor data being obtained from one or more sensors.

In various embodiments, elements comprising the system are delivered in one or more shipping containers, trailers, boxes, crates, or other containers. Instructions are provided to unpack, extend, position, interconnect, and/or assemble the elements in a desired workspace adjacent to a work area in which the system will operate, e.g., such as to robotically palletize and/or depalletize items to/from one or more pallets.

Examples of elements comprising a system as disclosed herein include without limitation one or more robotic arms; one or more robotic end effectors; one or more bases or other structures on which said robotic arm(s) or other robots may be mounted; one or more cameras and/or other sensors; frames on which to mount said cameras and/or sensors and/or on which said cameras and/or sensors may be pre-mounted; gates, fences, and other barriers; light curtains and/or other sensors to detect that a human entered a zone, indicator/warning lights, audible alarms, and other safety equipment; one or more control computers or processors; network communication equipment; and one or more power supplies.

FIG. 1A is a diagram illustrating a containerized robotic system according to various embodiments. In the example shown, containerized robotic system 100 (e.g., a robotic item handling system) includes a set of components in a stowed or folded state comprised in container 105. Container 105 may be a shipping container, crate, or other container. In some embodiments, container 105 is a standard shipping container and the various components of containerized robotic system 100 are sufficiently small or foldable to collectively fit within container 105. The contained and components within may have been shipped as a single container, or a small number of containers, to a destination at which the robotic system is to be deployed.

In some embodiments, containerized robotic system 100 comprises substantially all of the necessary components for the robotic system to be deployed at a destination location (e.g., a warehouse). For example, containerized robotic system 100 comprises those components other than the infrastructure of the warehouse to enable quick and simple deployment of containerized robotic system 100 at the warehouse. The warehouse may comprise infrastructure such as environmental lighting, flooring, power infrastructure to be connected to the deployed robotic system, etc.

In some embodiments, the components comprised in containerized robotic system 100 include one or more a robotic arm, an end effector, a robot base to which a robotic arm is mounted, a rail along which the robotic arm traverses, a table, a vision system (e.g., a set of sensors), a safety system, a lighting or sensor system, one or more tables or surfaces for receiving or placing items, a conveyor or conveyance system, one or more frames such as sensor frames to hold the sensor or other components within the work zone of the robotic arm, a set of one or more fiducial markers, a computer system (e.g., a control system), an air compressor, pneumatic tubes, and connections or couplings for the various components within containerized robotic system 100. In the example shown, visible in the open front of container 105 are frames 110, 115 (left and right outer edges) in a nested and stowed position that is compact for packing and shipping. Container 105 further comprises robotic arm 120 in a compact or stowed position/pose, as shown in the center of the open front. Various other components may be comprised within container 105, such as barriers and other safety equipment, a robot controller, etc.

FIG. 1B is a diagram illustrating a frame comprised in a containerized robotic system according to various embodiments. In some embodiments, containerized robotic system 100 comprises a set of frames, such as frame 115. In the example shown, frame 115 is compactly stored and an easily deployed frame. As an example, frame 115 be deployed to mount one or more of lighting or status indicators, cameras, and/or other sensors. Frame 115 may comprise upper frame 116 (e.g., a sensor, lighting, or status indicator support structure), lower frame 117 to upper frame 116, and a set of feet such as foot 118. The set of feet may rest on the ground/floor of the warehouse or may be mounted thereto.

To get a clear view of the workspace, at least some cameras may need to be mounted at a height above the height of the robotic arm, for example. However, non-modular fully pre-assembled structures to mount a camera at such a height might be too large or long in one or more dimensions to be economically shipped. In the example shown at top in FIG. 1B, a camera/sensor frame is shown at left in a stowed/nested configuration for shipment, but an upper frame 116 is extracted from a position at least partly nested within the lower frame 117 and is rotated up into the deployed position as shown at right. Fasteners may be provided and used to secure the upper frame and the boom extending outward therefrom in the deployed position as shown. As shown in the lower images, in this example the boom may be extended to different extents, e.g., depending on the workspace and/or the task the system will be configured to perform.

FIG. 1C is a diagram illustrating a sensor system comprised in a containerized robotic system according to various embodiments. In the example shown, the containerized robotic system 150 is partially deployed. For example, a set of camera/sensor frames 154, 156, and 158 are deployed. The camera/sensor frames may correspond to frame 115.

As illustrated, camera/sensor frames 154, 156, and 158 that have been extended to their deployed configuration, have had cameras and/or other sensors mounted thereon and, and have been positioned around the periphery of the workspace with the cameras/sensors pointed into the center of the workspace, as shown. In this example, camera/sensor frame 154 has been placed behind a conveyor 152 that will bring items to (or from) a robotic arm, as described below, or otherwise behind a table that serves as a pickup zone for items. Camera/sensor frames 156, 158 have been placed to either side of the workspace. Camera 160 and sensor 166 may be mounted to camera/sensor frame 154. Additionally, camera 162 may be mounted to frame 156, and camera 164 may be mounted to camera/sensor frame 158. Containerized robotic system 150 may further comprise a status indicator mounted to a camera/sensor frame, such as a lighting system to provide status indicators for a safety system.

Figure 1D:
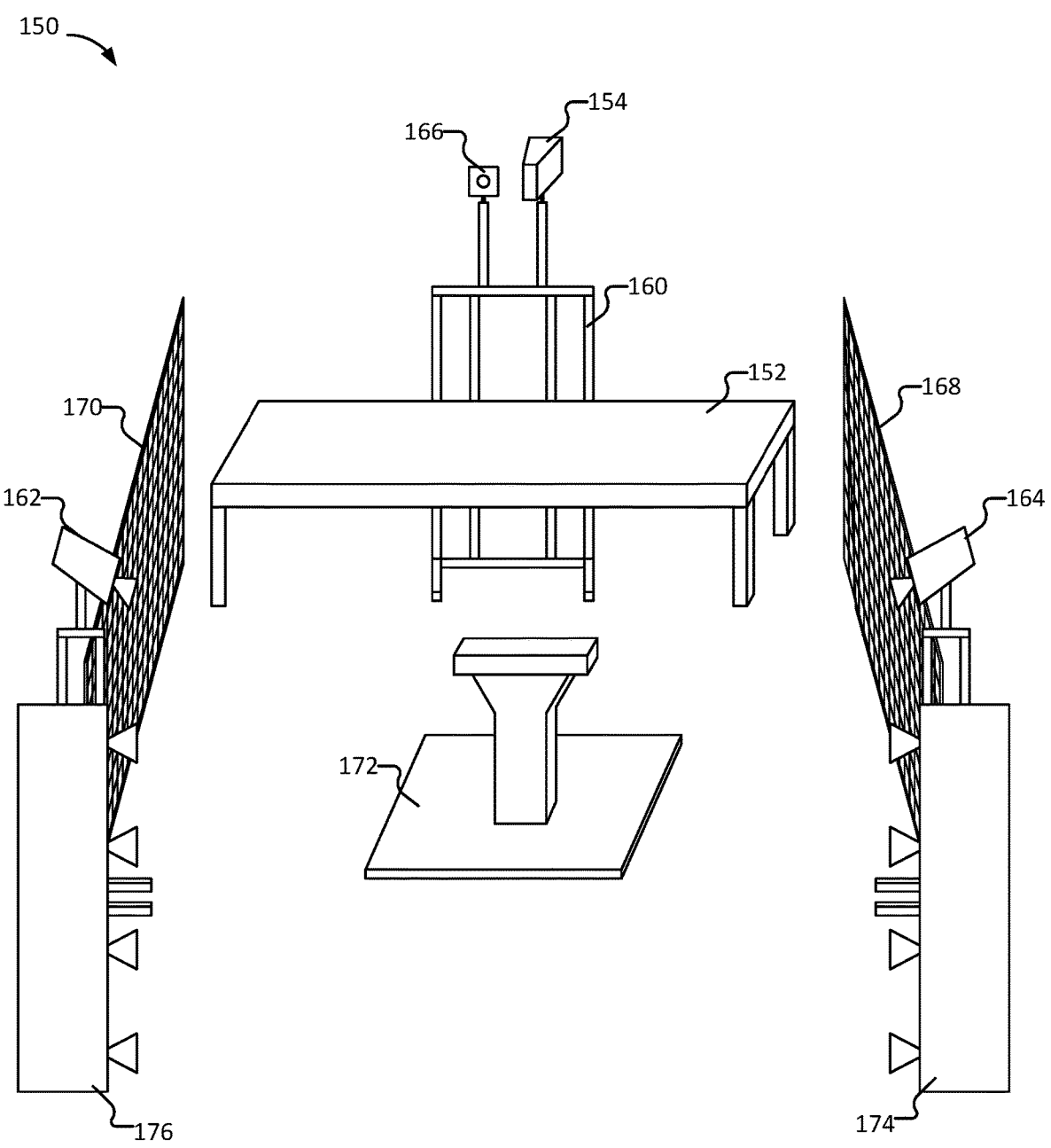
FIG. 1D is a diagram illustrating a work zone for a containerized robotic system according to various embodiments.

FIG. 1D is a diagram illustrating a work zone for a containerized robotic system according to various embodiments. In the example shown, further components of containerized robotic system 150 are deployed in the workspace. The components may be deployed at predefined positions and orientations. An application running on a client terminal may configure a user interface to illustrate or otherwise indicate where the various components of containerized robotic system 150 are to be deployed.

As an example, FIG. 1D shows a next stage of deployment, in which safety barriers 168, 170 have been placed on either side of the workspace, e.g., by securing them to elements of the adjacent camera/sensor frames 156, 158 and/or the back wall. Light curtain elements 174, 176 have been positioned on either side of the opening that allows someone to enter into the workspace, e.g., to detect a human or other object crossing into the space (e.g., as a result of the human's body breaking continuity of one or more light beams). In addition, a pedestal structure 172 on which the robotic arm may be mounted has been anchored to the floor in the center of the workspace, e.g., at a prescribed distance from the conveyor.

Figure 1E:
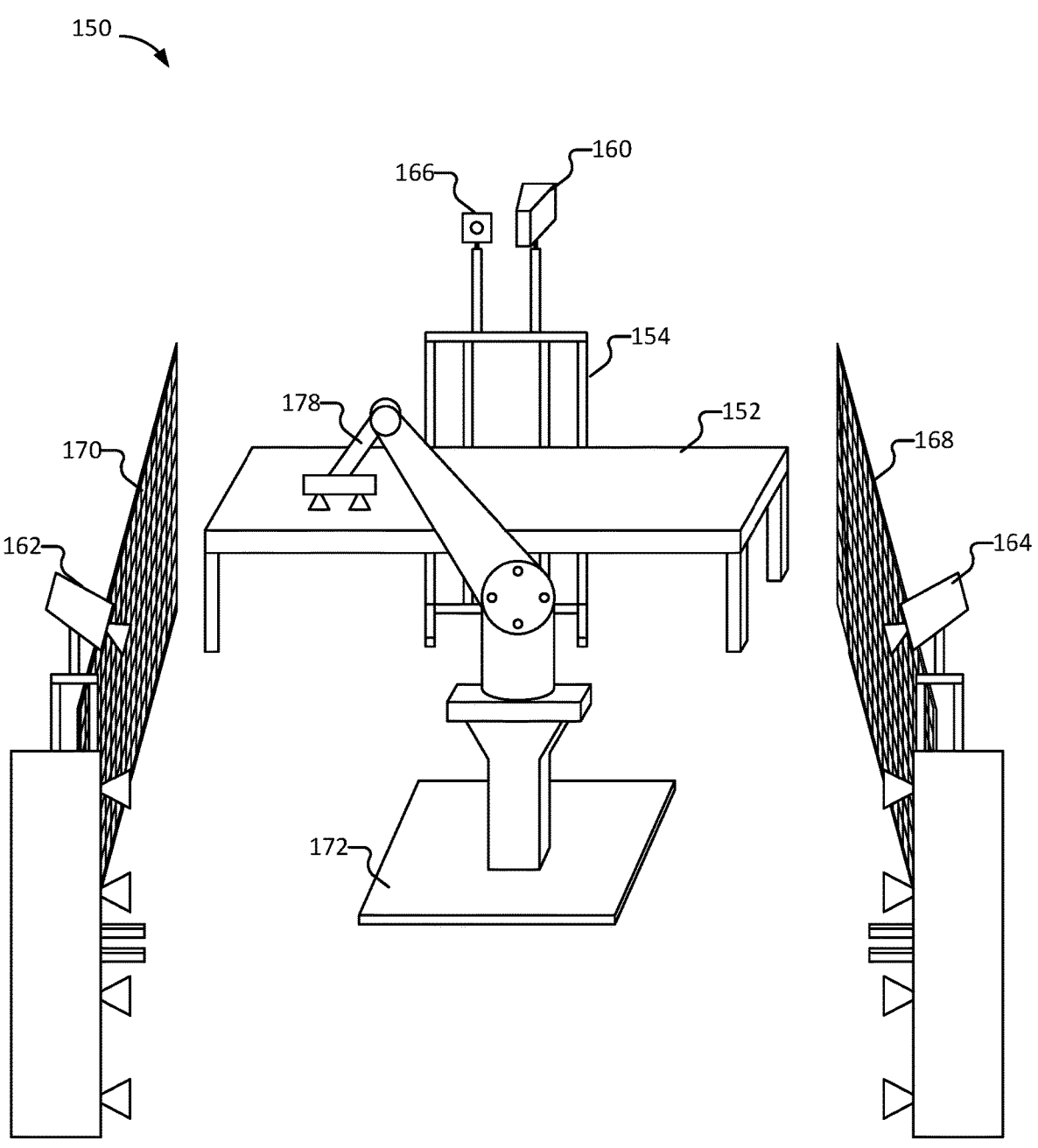
FIG. 1E is a diagram illustrating a work zone for a containerized robotic system according to various embodiments.

FIG. 1E is a diagram illustrating a work zone for a containerized robotic system according to various embodiments. In the example shown, further components of containerized robotic system 150 are deployed in the workspace. In the state shown in FIG. 1E, a robotic arm 178 with a suction type end effector has been mounted on the anchored pedestal structure 172.

In various embodiments, the system is delivered with cables, hoses, clips, guides, etc. to make electrical, pneumatic, and/or network connections to elements comprising the system, including to a robotic controller (e.g., control system) included in the system, in various embodiments, but not shown in FIG. 1E.

In various embodiments, the controller comprises one or more processors and computer memory or other data storage and/or power supplies and/or drivers to control and manipulate the robotic arm 178 and its end effector to perform configured tasks, such as a to pick items from the conveyor and place them on a pallet. Additionally, the controller operates a safety system, such as the activation/triggering of an emergency stop and control of one or more status indicators. In various embodiments, the controller implements a configuration or calibration process for verifying the configuration/calibration of robotic system 150.

Figure 1F:
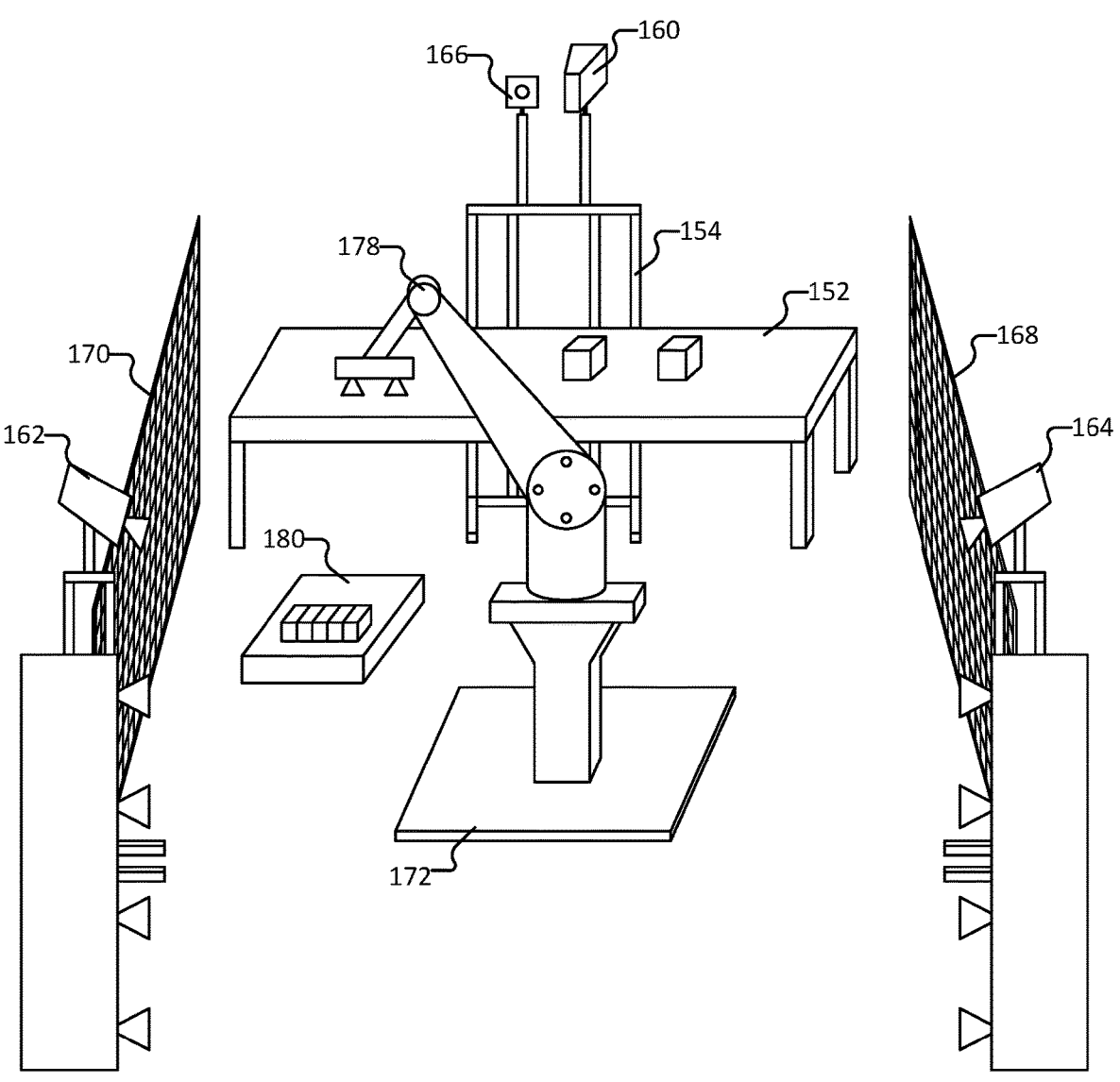
FIG. 1F is a diagram illustrating a deployed containerized robotic system according to various embodiments.

FIG. 1F is a diagram illustrating a deployed containerized robotic system according to various embodiments. Robotic system 150 as shown in FIG. 1E is configured in part by invoking, via a simple administrative user interface, an automated configuration and/or calibration procedure. The calibration procedure enables camera and/or other sensor data to be used to generate and update a three-dimensional view of the robotic arm 178 and the workspace. Computer vision techniques may be used to locate, classify, grasp, move, and place items, e.g., by picking item from the conveyor 152 and placing them in an orderly manner on a pallet 180, as shown in FIG. 1F.

The controller (e.g., the control system for robotic system 150) may be configured to generate a model of the workspace, and to determine optimal pick and place operations, such as according to a predefined scoring function.

In some embodiments, the system uses computer vision techniques and artificial intelligence to identify a configuration of the robotic system or to otherwise configure the robotic system to manipulate items within a workspace.

Figure 2:
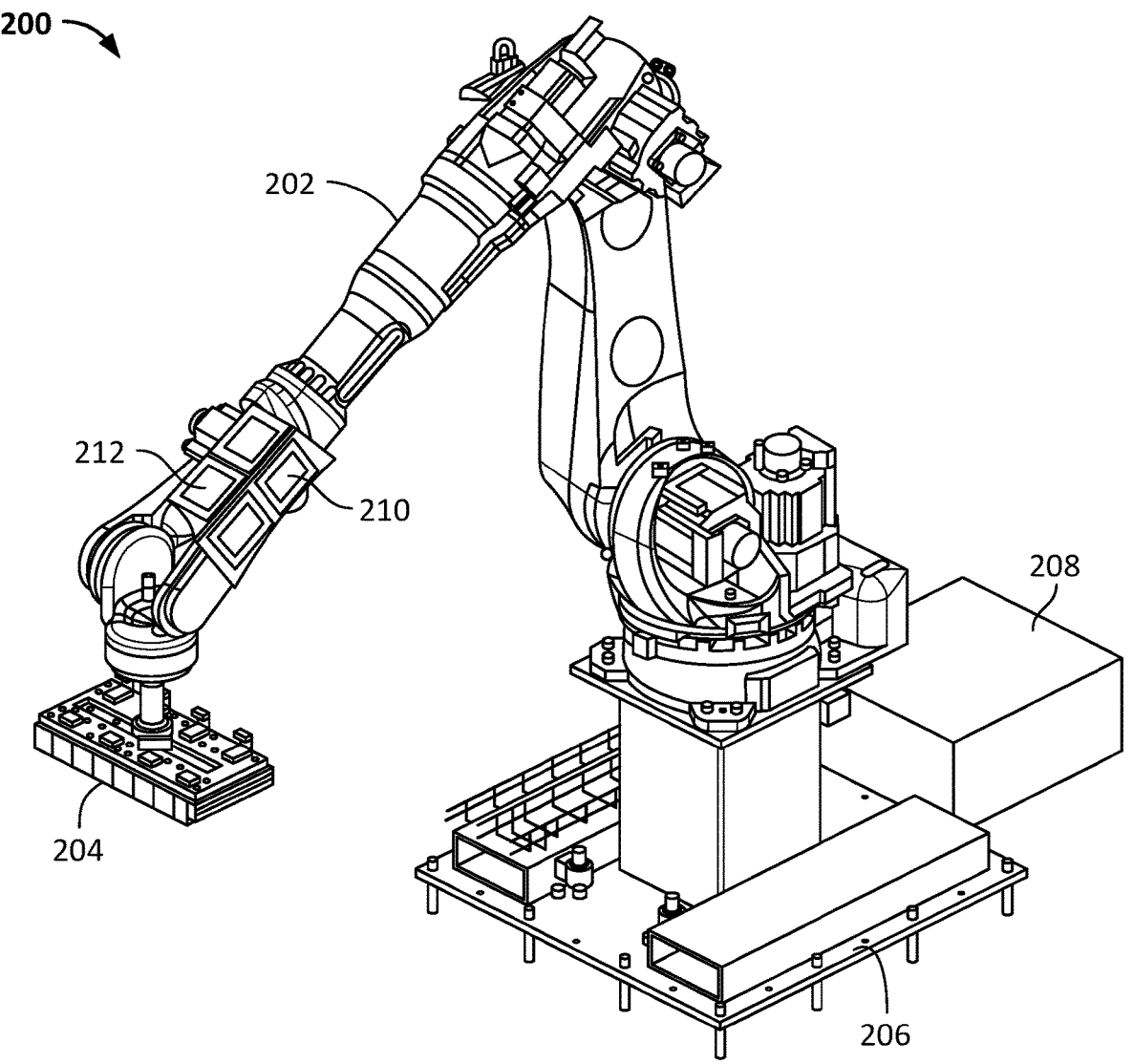
FIG. 2 is a diagram illustrating a robotic arm included in a system according to various embodiments.

FIG. 2 is a diagram illustrating a robotic arm included in a system according to various embodiments. In the example shown, robot 200 includes a robotic arm 202 having a suction type end effector 204 mounted on a base 206, which is in turn anchored to the floor/ground. A robotic controller 208 positioned behind the robotic arm 202 and base 206, e.g., a side opposite a primary work area in which the robot 200 will use robotic arm 202 and end effector 204 to pick, move, and place items, e.g., to stack the items on a pallet. In the example shown, robotic arm 202 has fiducial markers, e.g., 210, 212, mounted at 90 degree angles to one another, on adjacent sides of robotic arm 202. Various other fiducial markers may be comprised in the robotic system or mounted to the robotic arm and/or the fiducial markers may be mounted in various predefined orientations.

In various embodiments, a system as disclosed herein uses fiducial markers mounted on the robotic arm, such as 210, 212 to automatically calibrate the cameras and associated computer vision system. The sensor system (e.g., the cameras and/or associated computer vision system) are controlled to capture sensor data for the fiducial markers from various perspectives or orientations within the robot workspace.

In various embodiments, software preinstalled on a robotic controller or other computer comprising a system as disclosed herein runs the system through one or more automated safety checks and/or calibration routines.

Figures 3A, 3B, 3C:
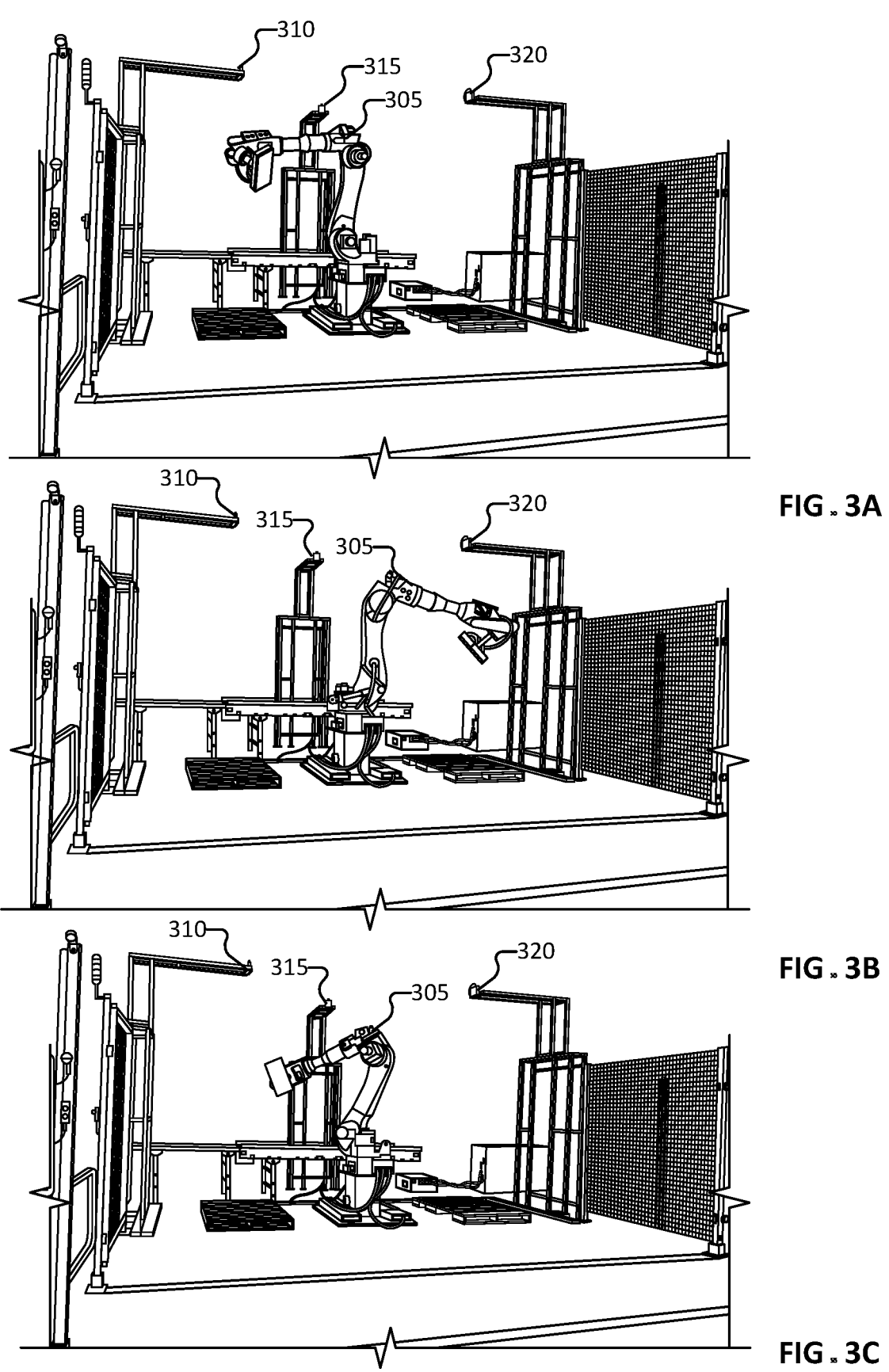
FIGS. 3A-3C are diagrams illustrating the configuration or calibration of a robotic system according to various embodiments.

FIGS. 3A-3C are diagrams illustrating the configuration or calibration of a robotic system according to various embodiments. In the example shown, a robotic arm 305 is moved through a variety of poses (top, middle, and bottom images, e.g.) to present fiducial markers mounted on the robotic arm to cameras (e.g., cameras 310, 315, and/or 320) mounted on frames deployed and placed on the periphery of the workspace, as in the example shown. The robotic controller knows the position and geometry of the robotic arm, so the precise location and orientation of each fiducial marker in three-dimensional space is known. The known positions/orientations can be compared to images generated by the various cameras and the differences used to compute transforms to apply to image data generated by the respective cameras. Additionally, or alternatively, the robotic controller uses the sensor data captured by the cameras to determine a plan for reconfiguring/recalibrating the robotic system, such as adjustment of the positioning of a frame and/or associated camera/sensor, positioning of the conveyance structure, and/or positioning of the pallets.

In the example shown in FIG. 3A illustrates robotic arm 305 being controlled to extend the end effector leftwards in the workspace. FIG. 3B illustrates robotic arm 305 being controlled to extend the end effector rightwards in the workspace. FIG. 3C illustrates robotic arm 305 being controlled to extend the end effector leftwards in the workspace with the end effector being positioned in a different orientation as compared to the pose illustrated in FIG. 3A.

In some embodiments, the robotic controller controls robotic arm 305 to move through the workspace to move through a predefined set of locations or to position robotic arm 305 in a predefined set of poses. For example, the robotic controller executes application code that controls robotic arm 305 to run through the predefined set of locations or the predefined set of poses. Robotic arm 305 may be moved to the predefined set of locations to ensure that the components are properly distanced and to ensure that the robotic arm 305 is not expected to collide with another object in the workspace during operation.

Figure 4A:
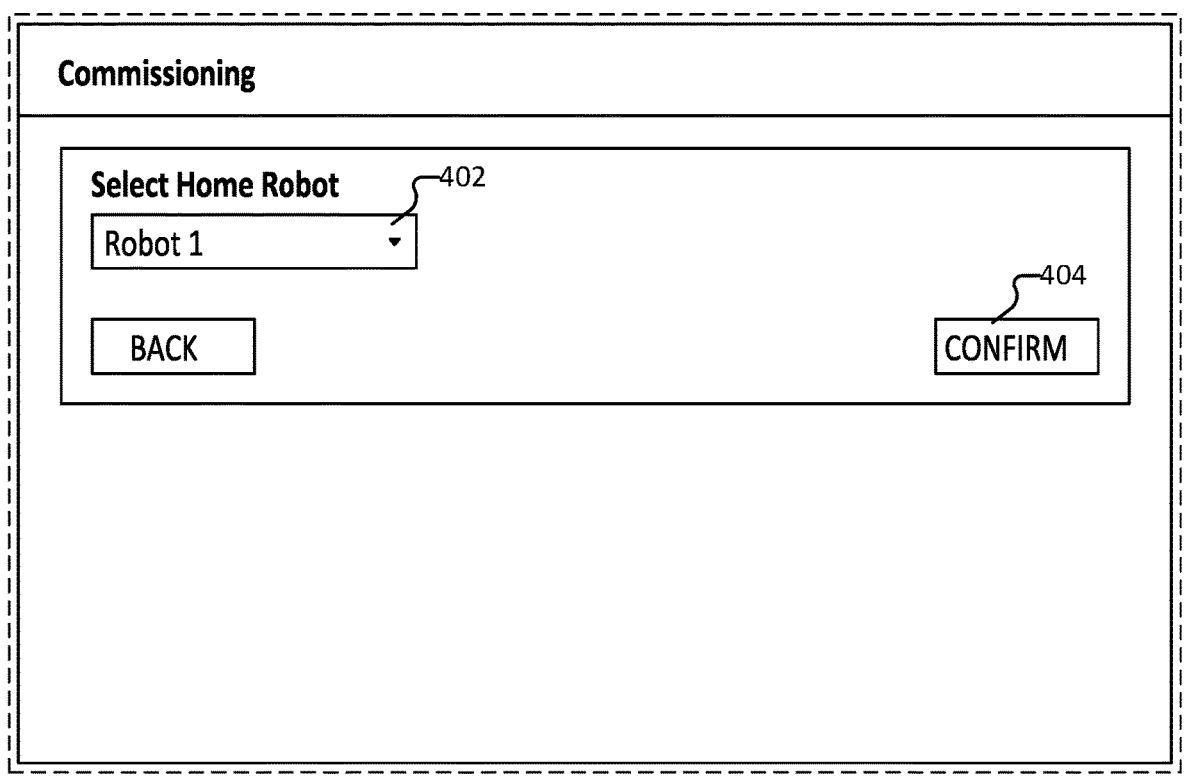
FIGS. 4A through 4T show various embodiments of screenshots of a configuration wizard software provided with a system according to various embodiments.
Figure 4B:
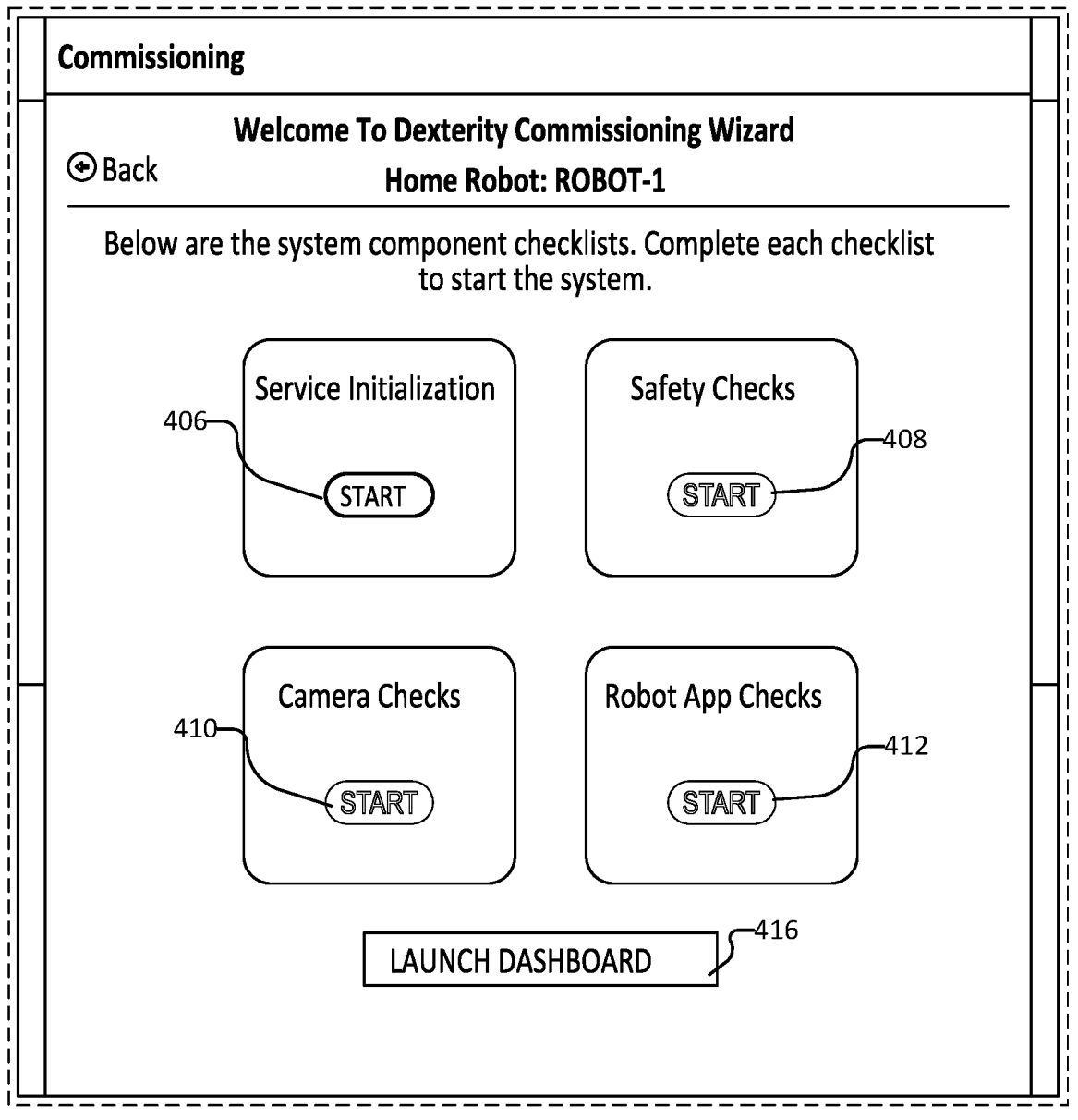
Figure 4C:
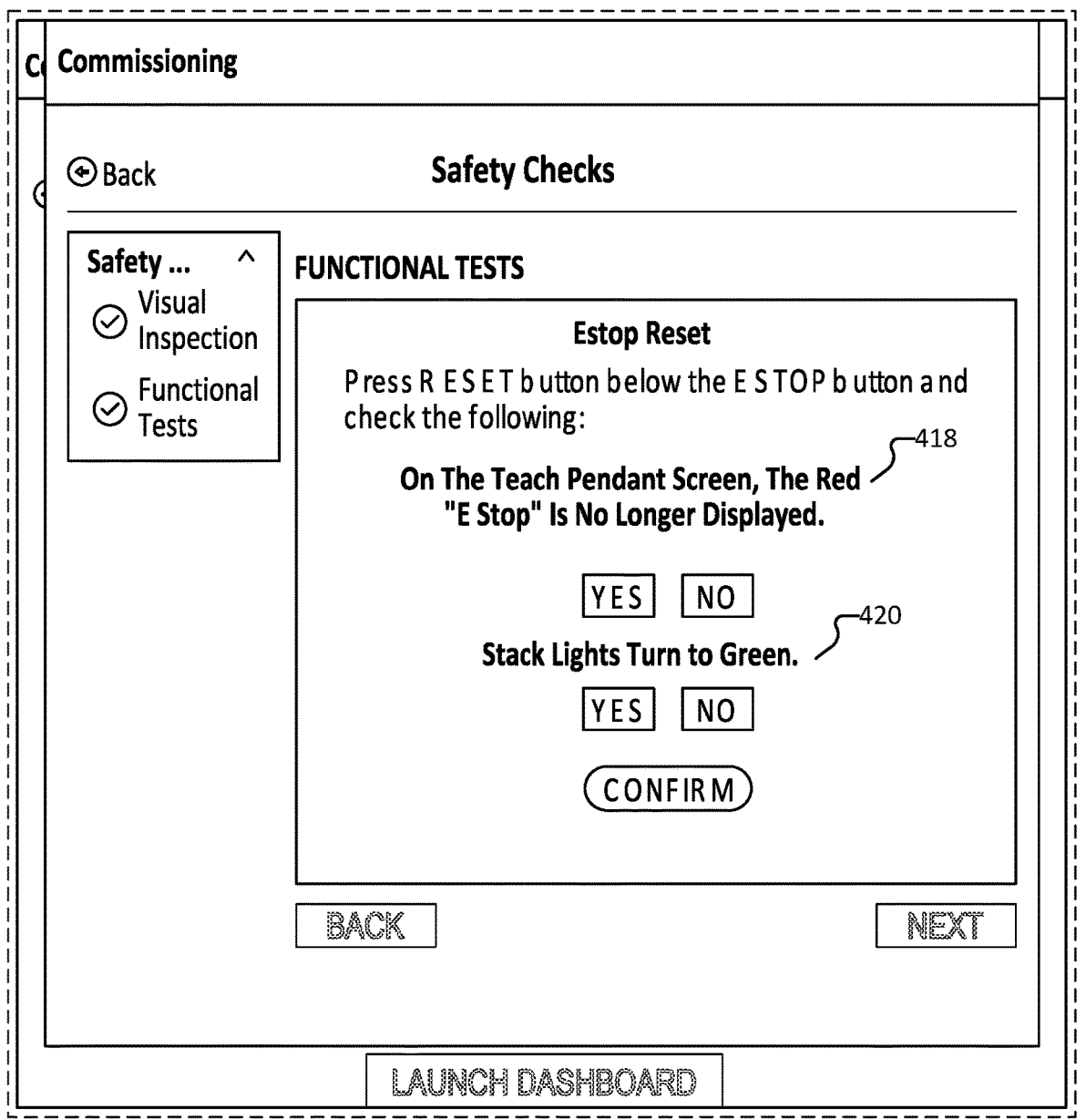
Figure 4D:
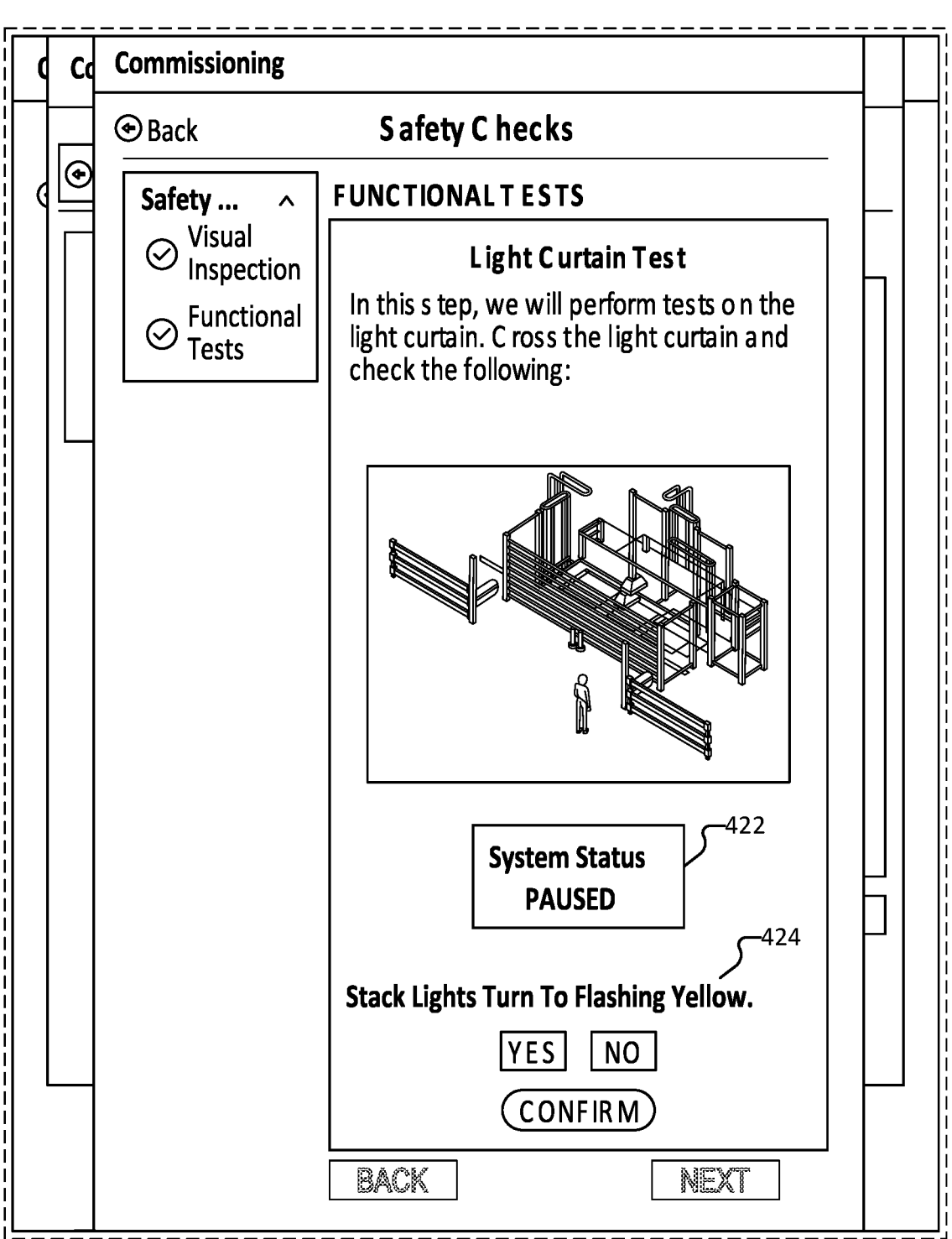
Figure 4E:
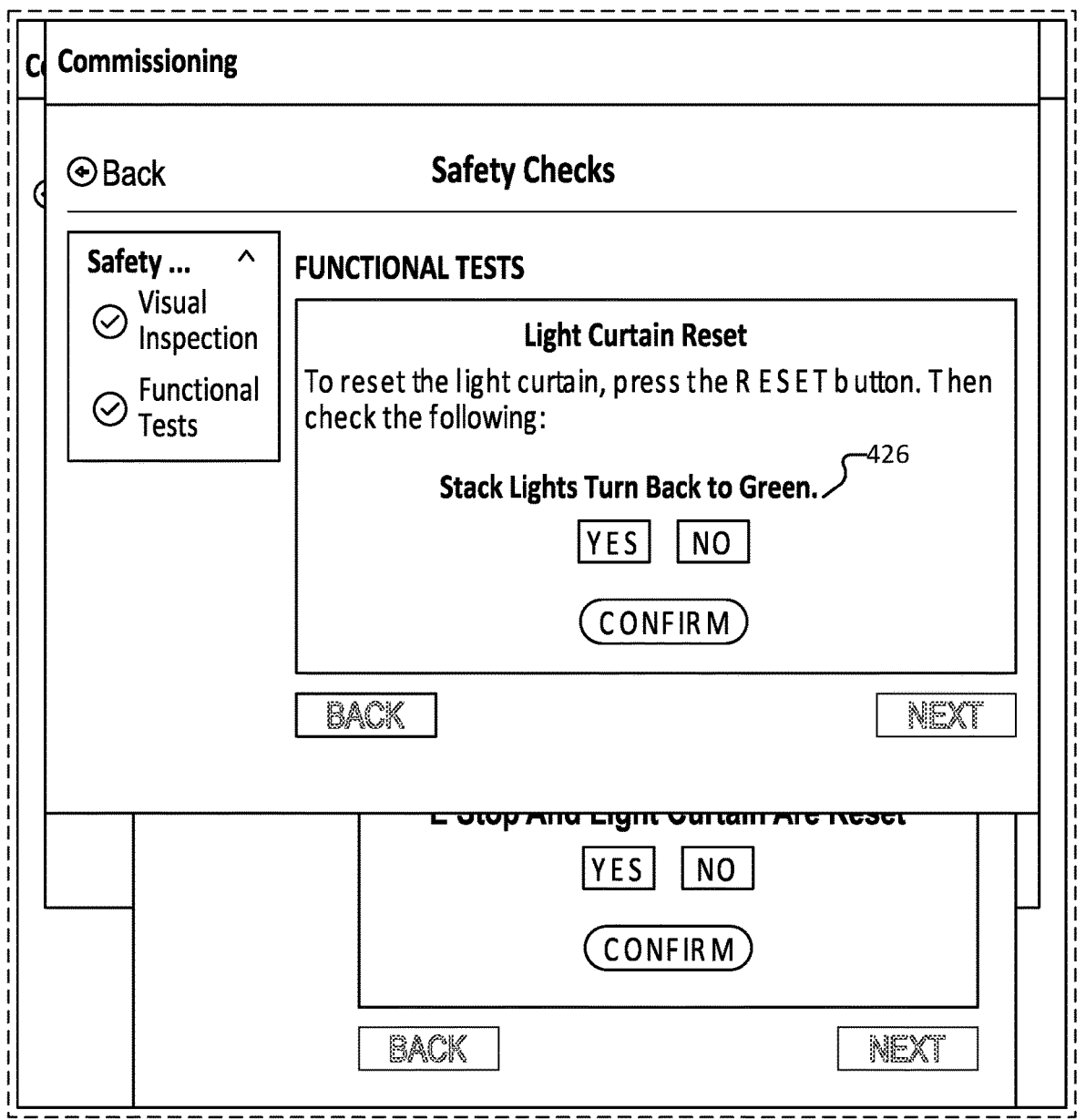
Figure 4G:
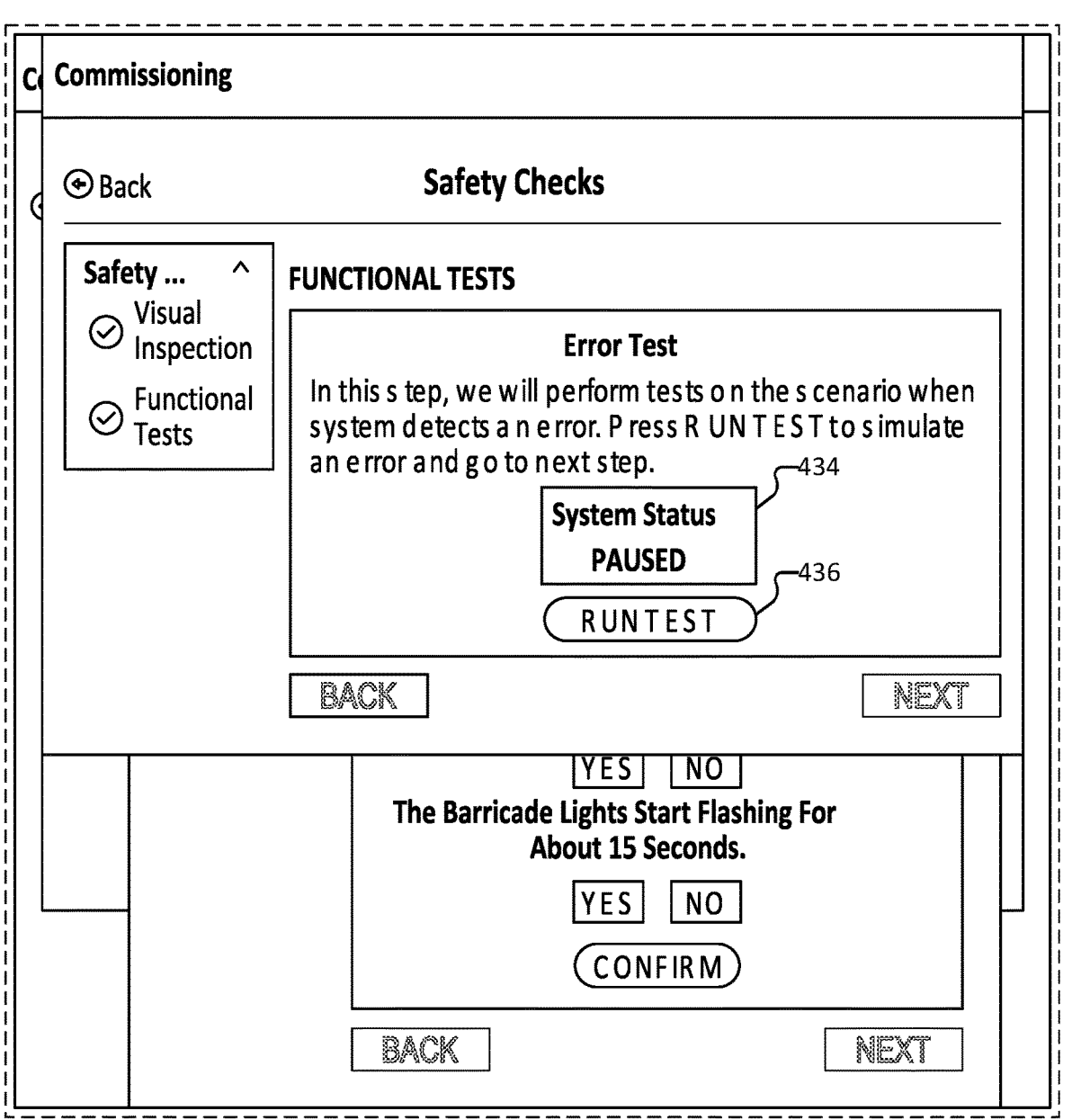
Figure 4H:
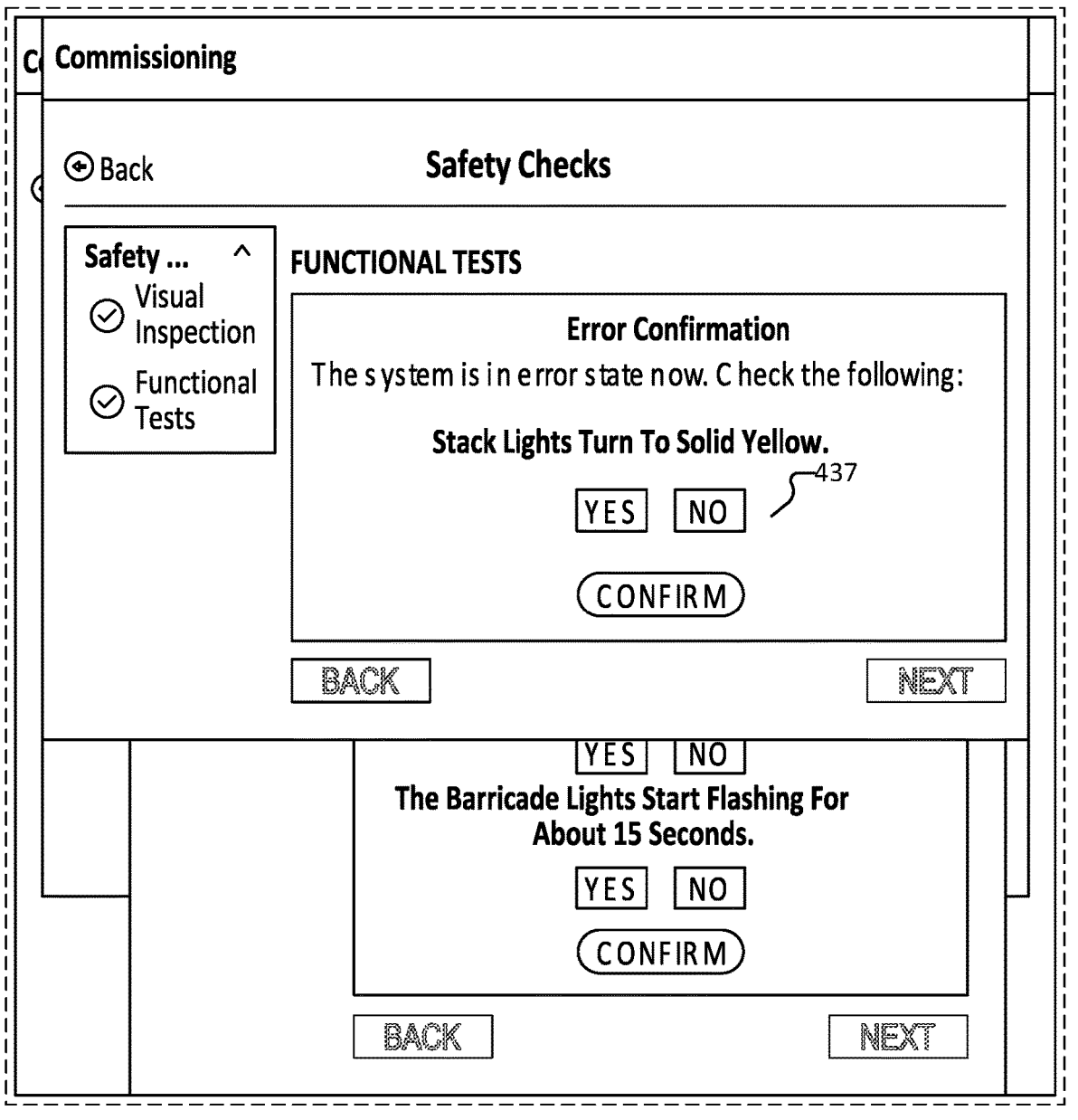
Figure 4J:
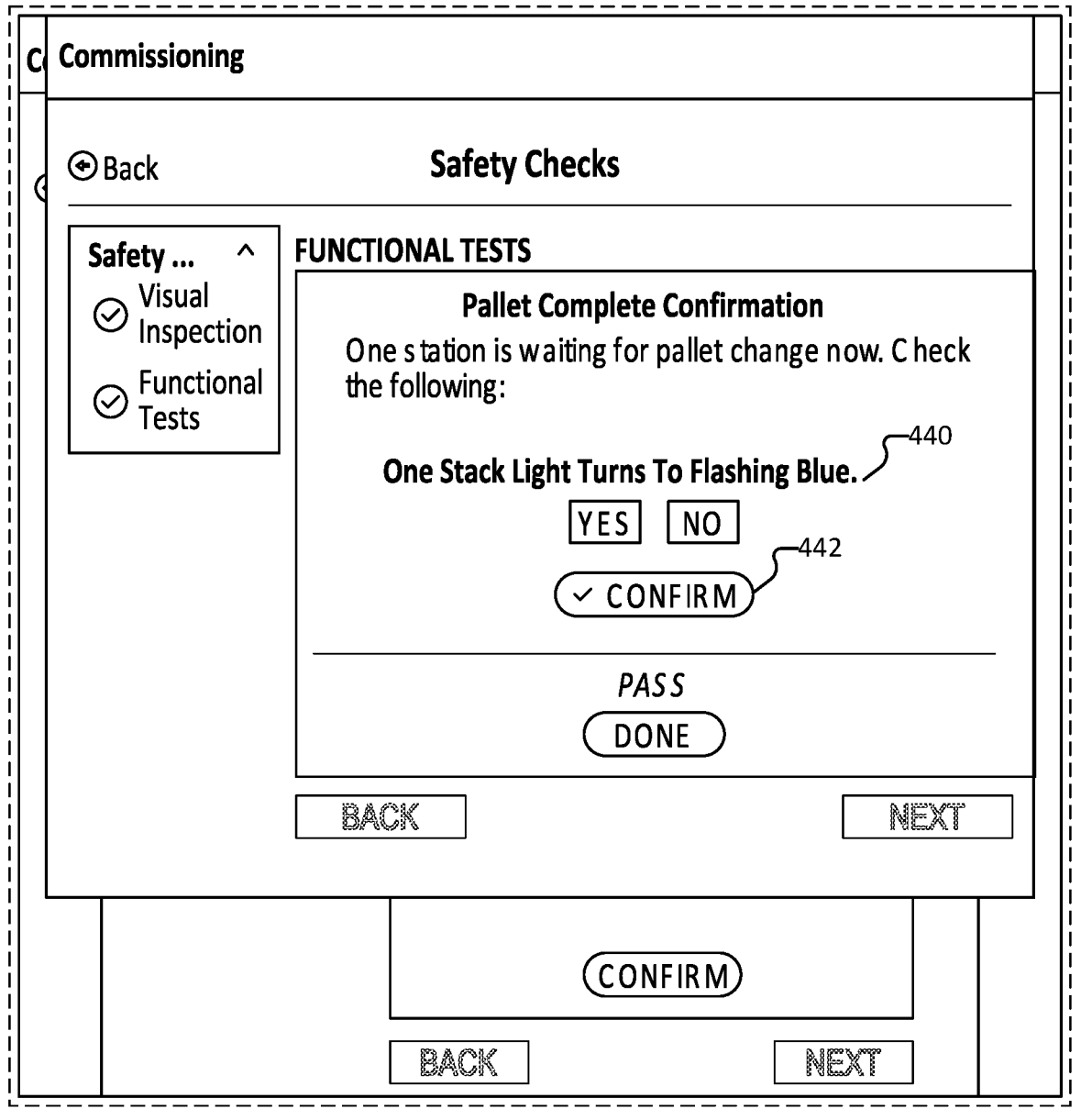
Figure 4K:
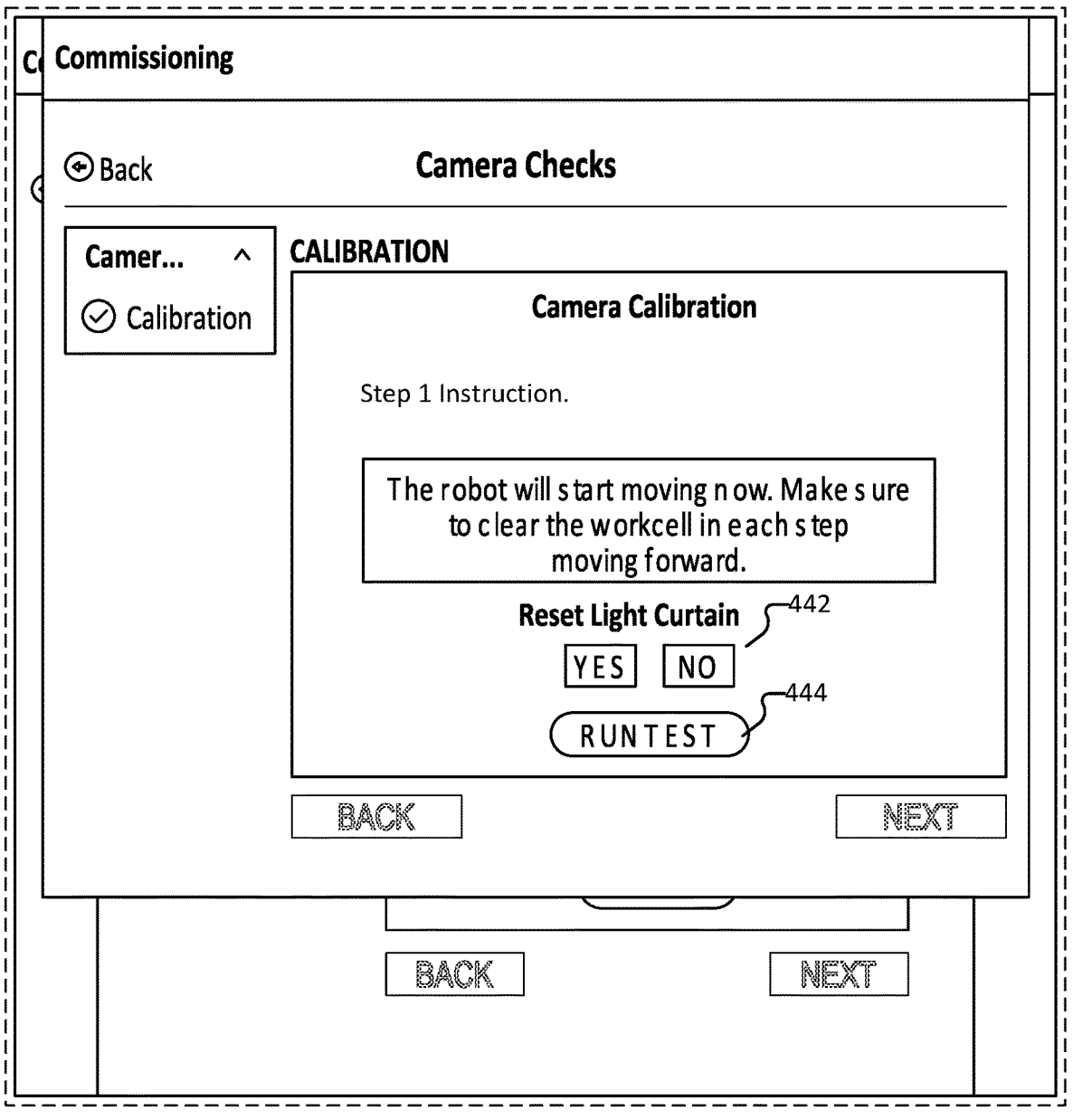
Figure 4L:
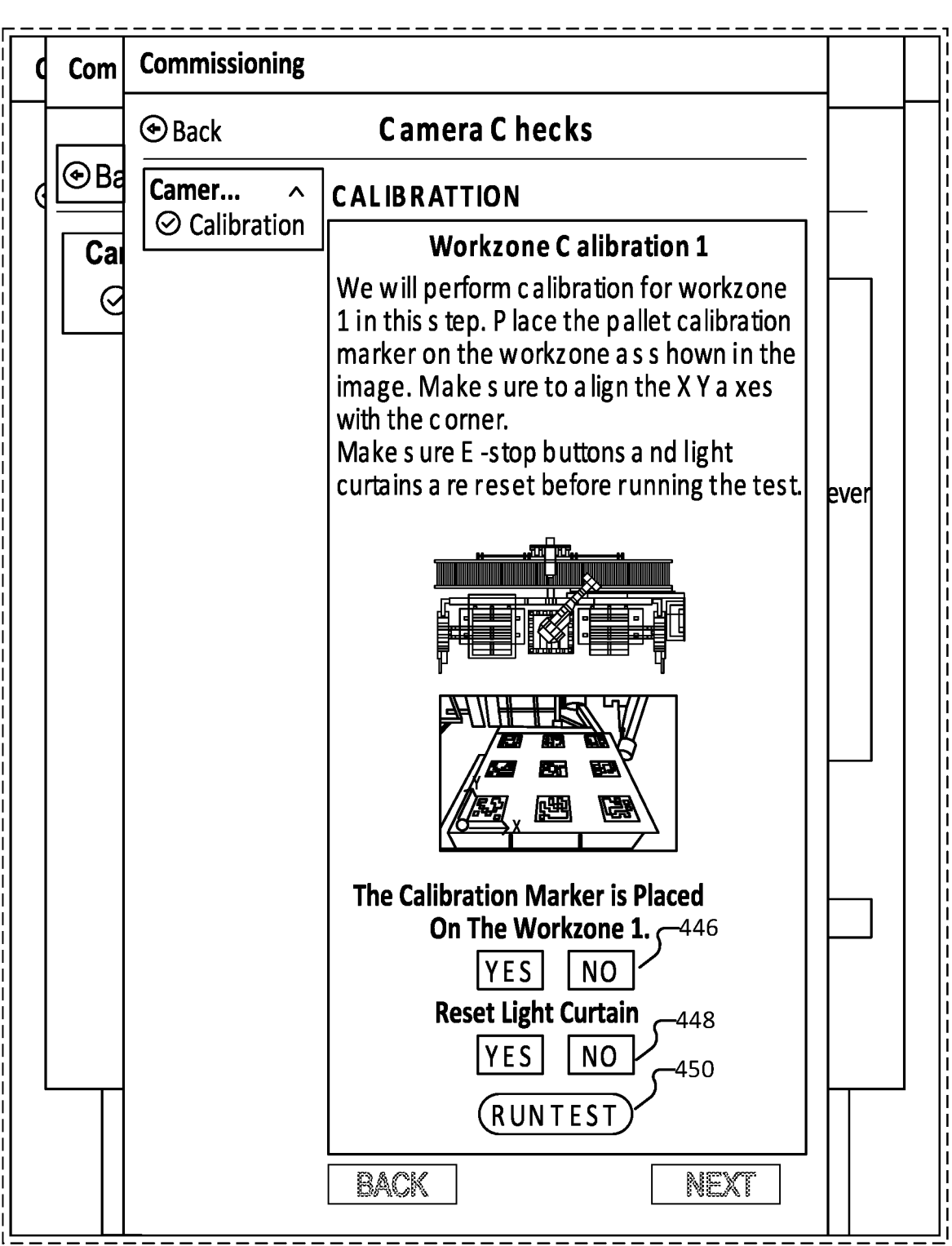
Figure 4M:
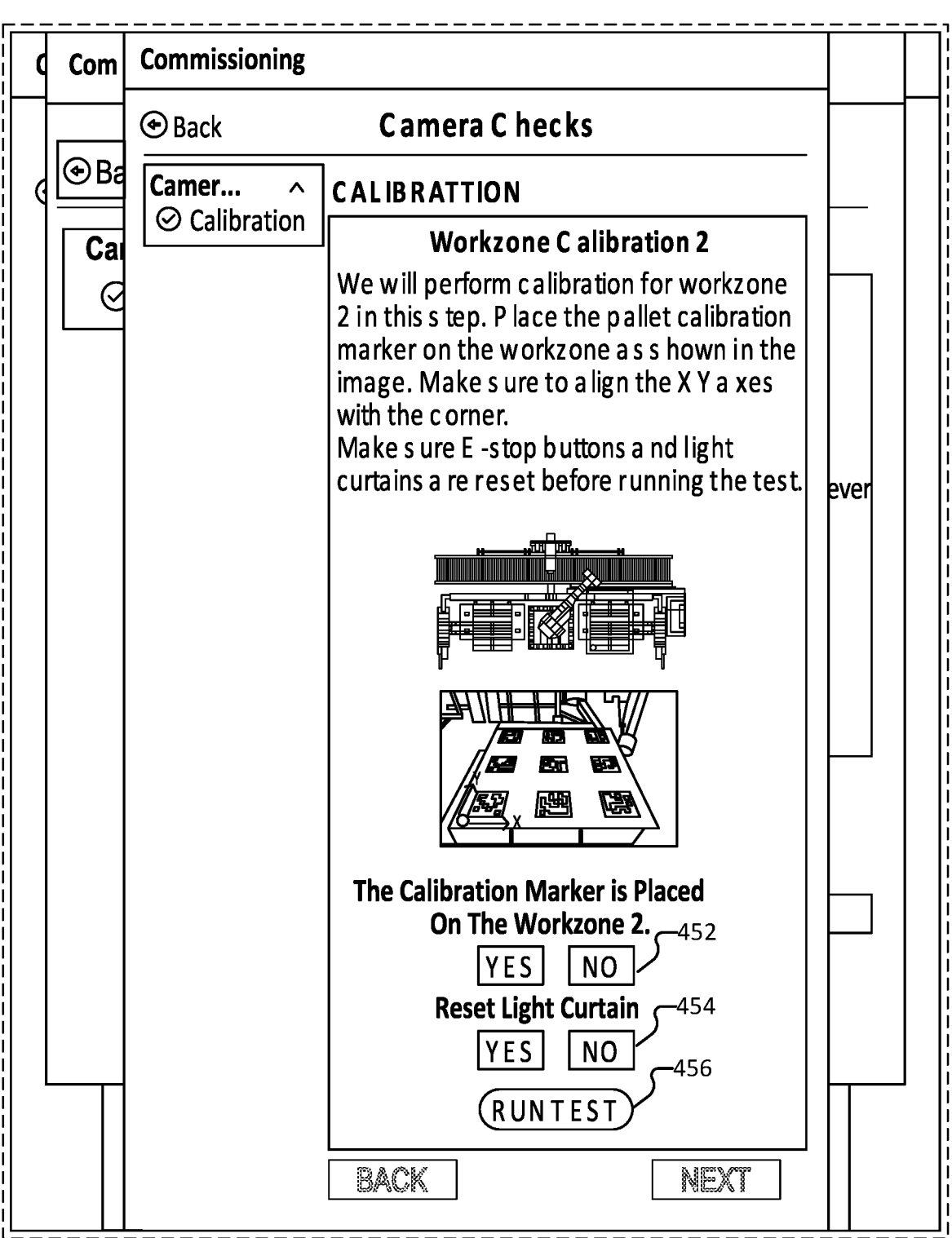
Figure 40:
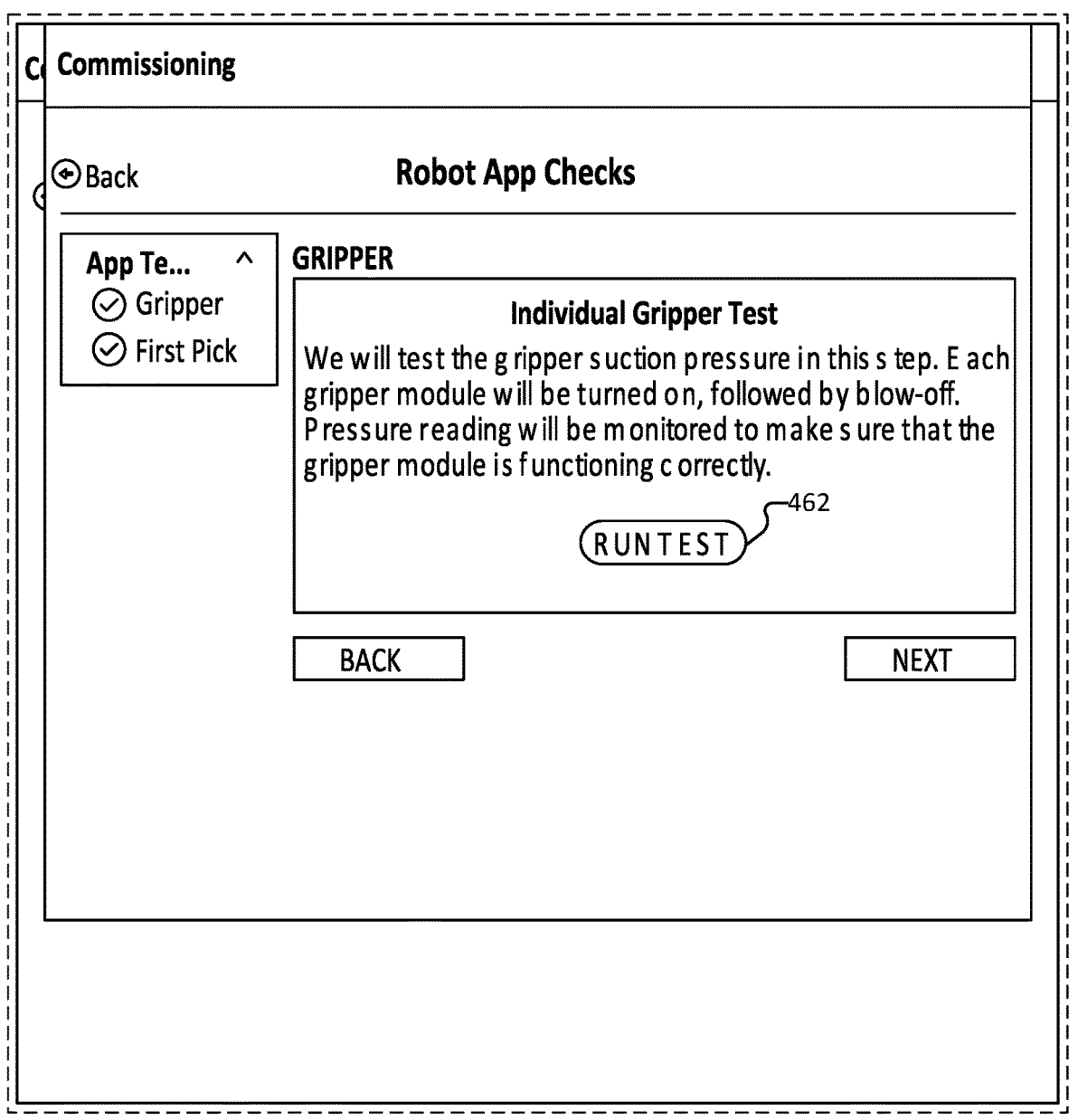
Figure 4P:
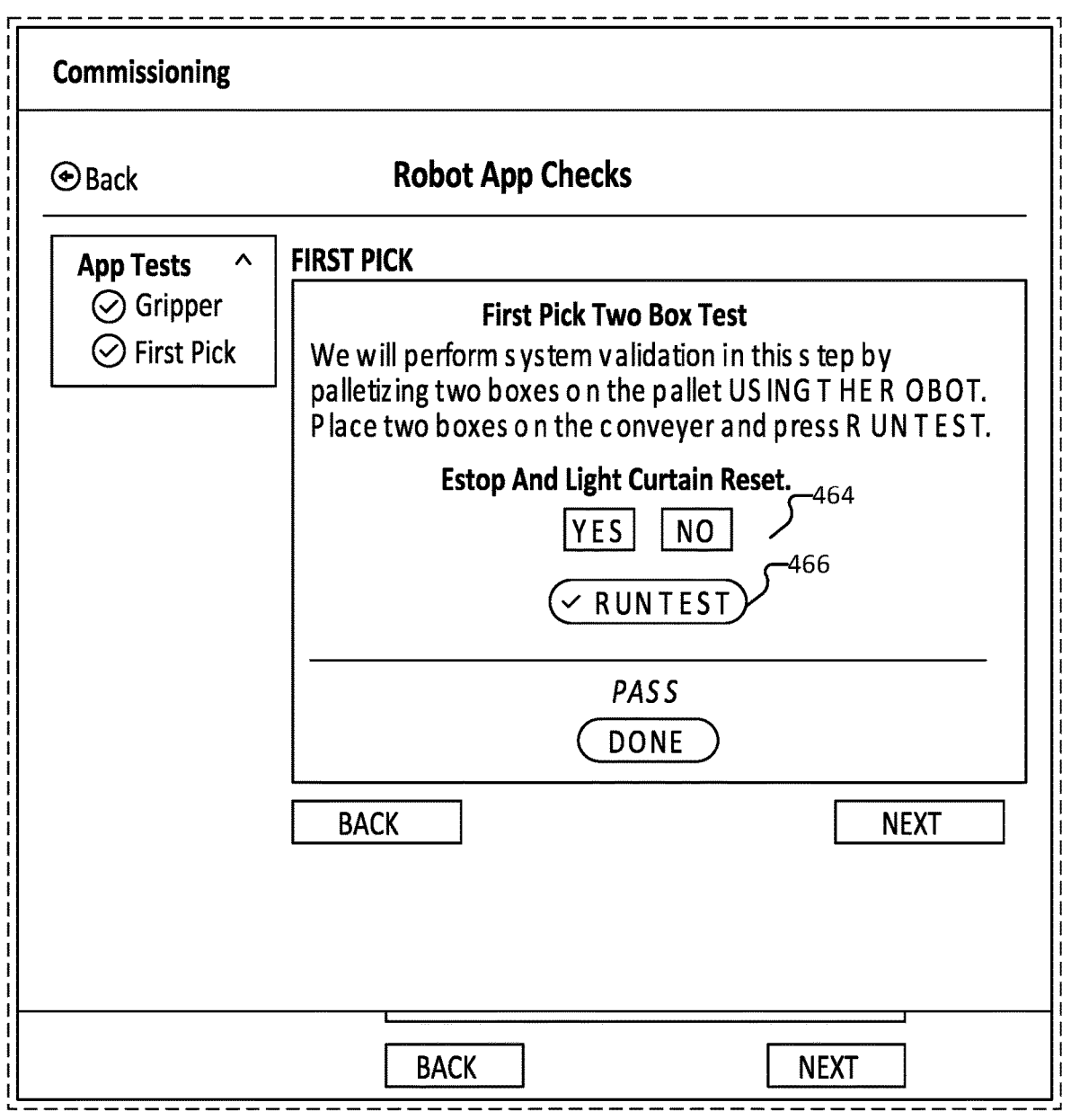
Figure 4Q:
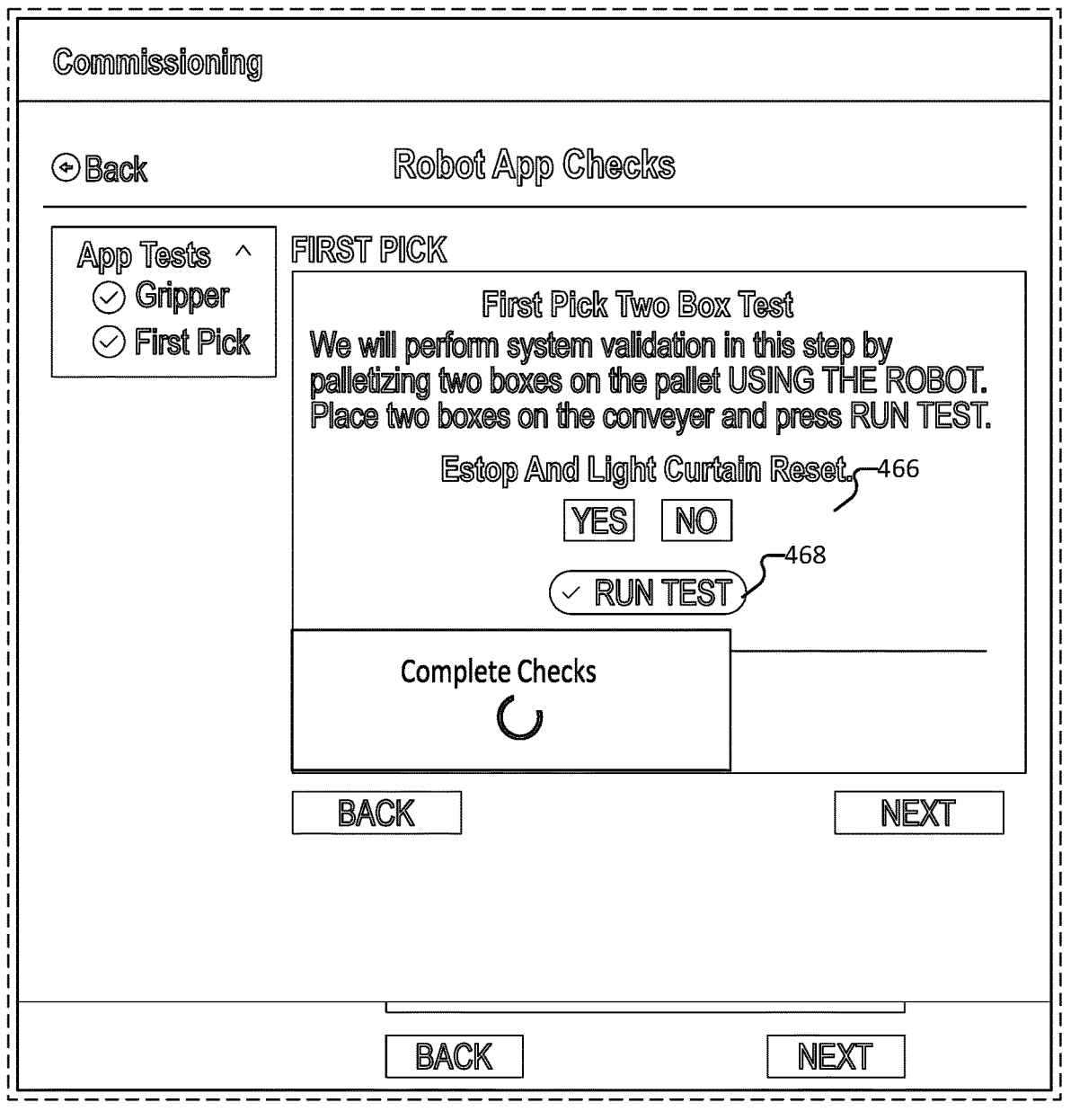
Figure 4R:
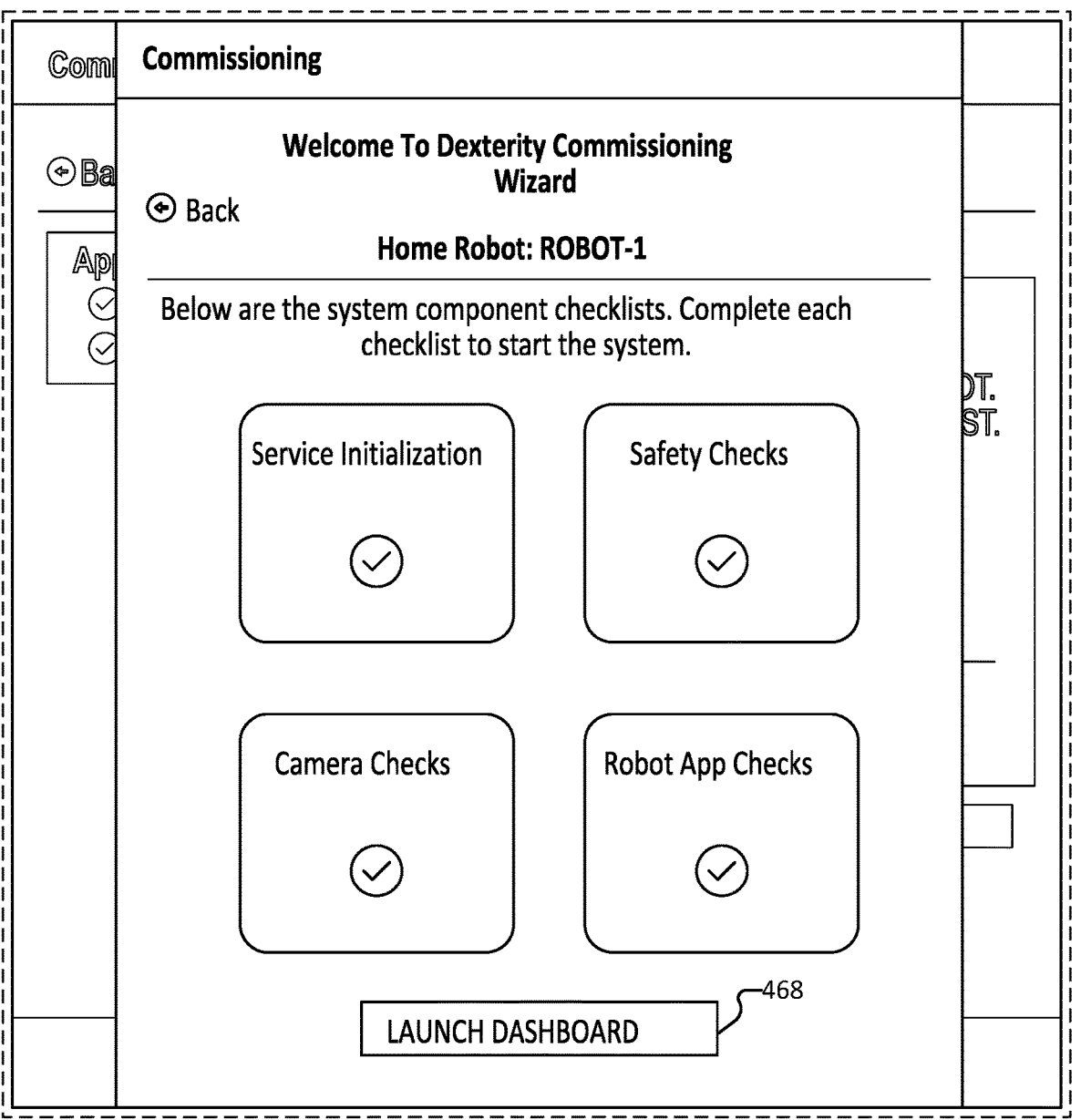
Figure 4S:
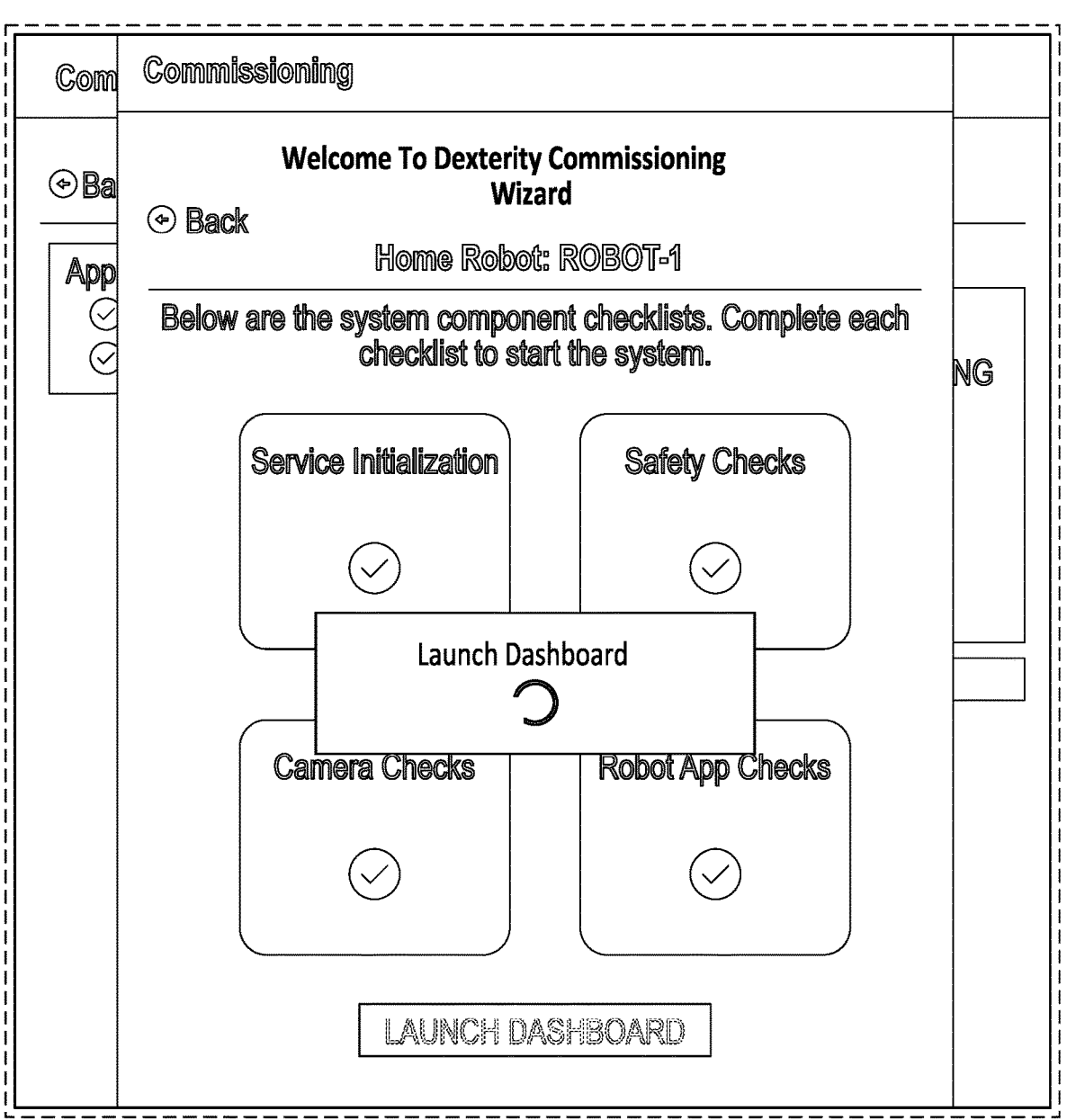
Figure 4T:
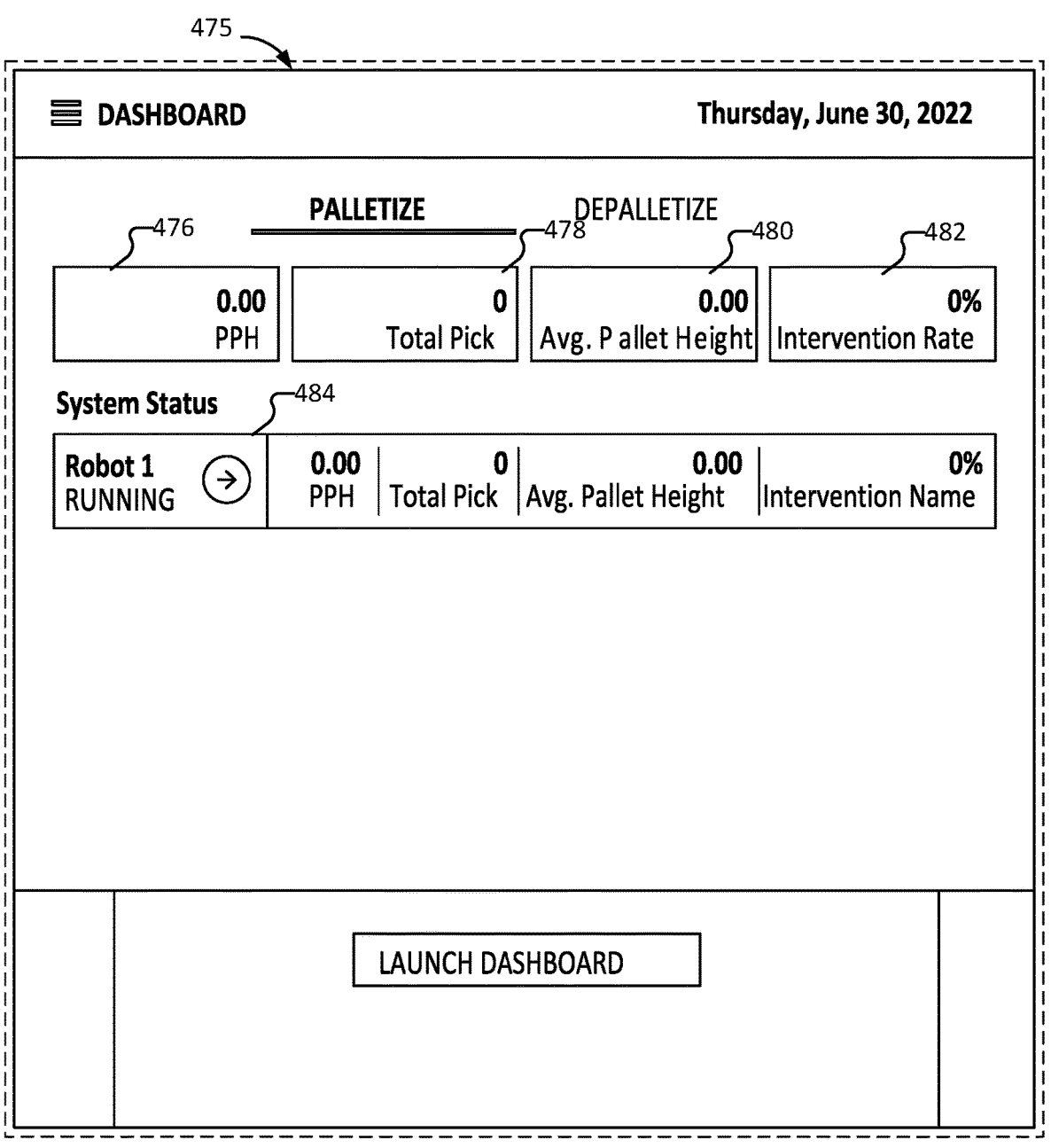

FIGS. 4A through 4T show various embodiments of screenshots of a configuration wizard software provided with a system according to various embodiments. In some embodiments, the configuration wizard software is used to configure, calibrate, and test the system (e.g., the containerized robotic system, such as robotic system 150) with minimal skill/knowledge and minimal inputs required of the installer.

For example, FIG. 4A shows a start screen from which a user can select a robot to be configured automatically using the wizard. Selecting a robot from the dropdown menu 402 and selecting the "Confirm" button 404 in the screen shown in FIG. 4A results in the welcome/home screen of FIG. 4B being displayed, with options to perform "Service Initialization" (e.g., corresponding to button 406), "Safety Checks" (e.g., corresponding to button 408), "Camera Check" (e.g., corresponding to button 410) which in various embodiments includes automatic calibration, and "Robot App Checks" (e.g., corresponding to button 412) which in various embodiments comprises a specific check (e.g., process or application) to the task/operation to be performed, such as palletization, singulation, or kitting, etc. Selection of the "start" button associated with one of the "Service Initialization", "Safety Checks", "Camera Check", and "Robot App Checks" (e.g., selection of one of buttons 406, 408, 410, and/or 412) causes the robotic controller (e.g., the wizard) to launch/execute an associated predefined configuration/calibration process. In various embodiments, selection of button 416 causes the robotic system to be initialized and/or to be configured for normal operation).

In some embodiments, once the "Service Installation" checklist accessed via the upper left button (e.g., button 406) of FIG. 4B has been completed, the "Safety Checks" described, initiated, and reported in FIGS. 4C through 4J may be initiated and performed (e.g., upon selection of button 408). The "Safety Checks" (e.g., the predefined process for verifying the safety checks) include testing the emergency stop ("Estop") reset and associated indicators (e.g., as shown in FIG. 4C), testing the light curtain and associated indicators (stack light turns "yellow" on curtain being crossed, "green" on reset) (e.g., as shown in FIG. 4D, 4E), a "request to enter" test (e.g., as shown in FIG. 4F), an "error" test (e.g., as shown in FIG. 4G, 4H), and a "pallet complete" or other task complete test (e.g., as shown in FIG. 4I, 4J).

As illustrated in FIG. 4C, the controller controls the robotic system to perform a predefined test of the safety system and configures the user interface to allow a user to provide feedback verifying the safety checks. Performing the predefined test of the safety system includes prompting a user to reset or test the emergency stop and to provide feedback for verification of the safety checks. Performing the safety checks includes receiving user input 418 pertaining to whether an "Estop" indicator is displayed and/or receiving user input 420 pertaining to a verification of whether a status indicator is working (e.g., that the lights for a stack of items or a pallet is green).

As illustrated in FIG. 4D, the controller controls the robotic system to perform a predefined test of the safety system and configures the user interface to allow a user to provide feedback verifying the safety checks. Performing the predefined test of the safety system includes prompting a user to perform a light curtain test (e.g., to verify whether the system detects and/or performs an active measure in response to a user entering the workspace during operation of the robotic arm) and to provide feedback for verification of the safety checks. Performing the safety checks includes providing a system status indication 422 and/or receiving user input 424 pertaining to whether status indicators or lights are triggered.

As illustrated in FIG. 4E, the controller controls the robotic system to perform a predefined test of the safety system and configures the user interface to allow a user to provide feedback verifying the safety checks. Performing the predefined test of the safety system includes perform a test pertaining to resetting a light curtain test (e.g., to verify whether the system properly reacts to a rest of the light curtain) and to provide feedback for verification of the safety checks. Performing the safety checks includes receiving user input 426 pertaining to whether status indicators or lights are properly reset upon the light curtain being reset.

As illustrated in FIG. 4F, the controller controls the robotic system to perform a predefined test of the safety system and configures the user interface to allow a user to provide feedback verifying the safety checks. Performing the predefined test of the safety system includes prompting a user to perform a request to enter test (e.g., to verify whether the system detects and/or performs an active measure in response to a user indicating, such as by selection of a button, that the user wishes to enter the workspace) and to provide feedback for verification of the safety checks. Performing the safety checks includes providing a system status indication 428, receiving user input 430 pertaining to whether a set status indicators or lights (e.g., a set of lights corresponding to an operator's request to enter the workspace) are triggered or operate in a certain manner, and/or receiving user input 432 pertaining to whether a set of status indicators or lights (e.g., a set of barricade lights) are triggered or operate in a certain manner (e.g., flash for a predefine period of time).

As illustrated in FIG. 4G, the controller controls the robotic system to perform a predefined test of the safety system and configures the user interface to allow a user to provide a user input, such as to initiate the test execution or to provide feedback verifying the safety checks. Performing the predefined test of the safety system includes performing a predefined scenario in which the system detects an error. The user interface is configured to provide a system status indicator 434 and a button 436 via which the user can initiate the corresponding safety check.

As illustrated in FIG. 4H, the controller controls the robotic system to perform a predefined test of the safety system and configures the user interface to prompt the user to verify a configuration/calibration and allow a user to provide feedback verifying the safety checks. The example user interface of FIG. 4H is configured in response to the system entering an error state (e.g., such as based on the predefined test initiated at the user interface shown in FIG. 4G). Performing the predefined test of the safety system includes performing prompting the user to perform a verification and receiving user input 437 pertaining to whether status indicators or lights are operated according to a predefined manner (e.g., that the stack lights turn to solid yellow).

As illustrated in FIG. 4I, the controller controls the robotic system to perform a predefined test of the safety system (e.g., to test whether the system operates normally in response to a pallet being complete) and configures the user interface to prompt the user to initiate the safety check by selecting button 438.

Figure 41:
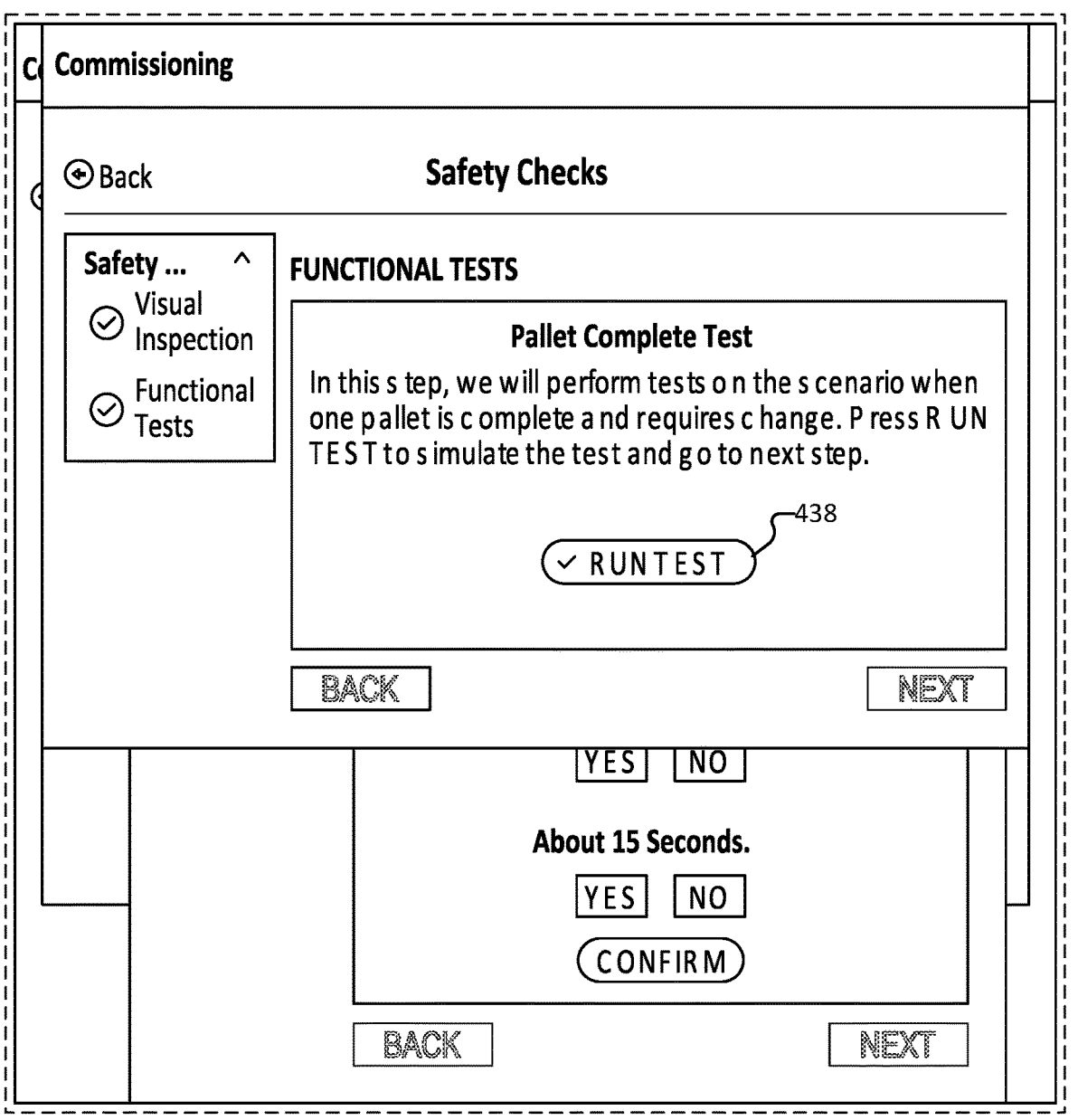

The user interface shown in FIG. 4J is configured in response to the safety check being initiated (e.g., via selection of button 438 on the user interface shown in FIG. 41). As illustrated in FIG. 4J, the controller configures the user interface to prompt the user to verify a configuration/ calibration and allow a user to provide feedback verifying the safety checks. Performing the predefined test of the safety system includes performing prompting the user to perform a verification and receiving user input 440 pertaining to whether status indicators or lights are operated according to a predefined manner (e.g., that a stack light turns to flashing blue or other predefined color), and receiving a user input 442 confirming the verification.

In this example, "Camera Checks" include automatic camera calibration (as shown FIG. 4K), e.g., as described above in connection with FIG. 3; and workspace calibration (FIG. 4L, 4M, 4N), e.g., by placing a pallet with fiducial markers on a designated pallet placement location in the workspace.

As illustrated in Figure K, the controller controls the robotic system to perform a predefined test of the sensor system (e.g., the camera) and configures the user interface to prompt the user to initiate the calibration test. Performing the predefined test of the camera calibration includes configuring the user interface to enable the user to provide user input 442 to reset the system (e.g., reset the light curtain) and user input 444 to initiate the camera calibration.

As illustrated in FIG. 4L, the controller controls the robotic system to perform a predefined test of the sensor system (e.g., the camera) and configures the user interface to prompt the user to initiate the calibration test. The camera calibration performed in connection with the user interface illustrated in FIG. 4L is a work zone (e.g., also referred to herein as a work space) test to confirm proper positioning/ alignment of components of the robotic system or other objects within the work zone. Performing the predefined test of the camera calibration includes configuring the user interface to enable the user to provide user input 444 to indicate that the calibration marker (e.g., a fiducial marker) is placed in a predefined location, to provide user input 448 to reset the system (e.g., reset the light curtain), and user input 450 to initiate the camera calibration.

As illustrated in FIG. 4M, the controller controls the robotic system to perform a predefined test of the sensor system (e.g., the camera) and configures the user interface to prompt the user to initiate the calibration test. The camera calibration performed in connection with the user interface illustrated in FIG. 4M is a work zone test to confirm proper positioning/alignment of components of the robotic system or other objects within the work zone. Performing the predefined test of the camera calibration includes configuring the user interface to enable the user to provide user input 452 to indicate that the calibration marker (e.g., a fiducial marker) is placed in a corresponding predefined location, to provide user input 454 to reset the system (e.g., reset the light curtain), and user input 456 to initiate the camera calibration.

As illustrated in FIG. 4N, the controller controls the robotic system to perform a predefined test of the sensor system (e.g., the camera) and configures the user interface to prompt the user to initiate the calibration test. The camera calibration performed in connection with the user interface illustrated in FIG. 4N is a work zone test to confirm proper positioning/alignment of components of the robotic system or other objects within the work zone. Performing the predefined test of the camera calibration includes configuring the user interface to enable the user to provide user input 458 to indicate that the calibration marker (e.g., a fiducial marker) is placed in a corresponding predefined location (e.g., the fiducial marker is placed on the conveyor or other pickup zone), to provide user input 460 to reset the system (e.g., reset the light curtain), and user input 462 to initiate the camera calibration.

FIGS. 4O through 4Q relate to "Robot App Checks". In this example, the robotic system will be used to perform a particular operation. The "Robot App Check" may be specifically configured for the particular operation, such as a process for performing a check for a palletization operation, e.g., by picking items from a conveyor or other source and stacking them on a pallet. These tests include a gripper test (FIG. 4O); and a "first pick two box test" (FIGS. 4P, 4Q). Various other operations may have corresponding configuration/calibration tests, such as a singulation operation, a kitting operation, etc.

As illustrated in FIG. 4O, the controller controls the robotic system to perform a predefined test for robot operation, such as for a particular operation (e.g., general grasping ability, palletization, singulation, kitting, etc.), and configures the user interface to prompt the user to initiate the test. The test performed in connection with the user interface illustrated in FIG. 4O is an end effector test (e.g., to test a suction for a suction-based operation, a grasping strength or operation for a hand, etc.). Performing the predefined test of the gripper includes configuring the user interface to enable the user to provide user input 462 to initiate the gripper test.

As illustrated in FIG. 4P, the controller controls the robotic system to perform a predefined test for robot operation, such as for a particular operation, and configures the user interface to prompt the user to initiate the test. The test performed in connection with the user interface illustrated in FIG. 4P is a pick test (e.g., to test the end effector's ability to pick two items, etc.). Performing the predefined test includes configuring the user interface to enable the user to provide user input 464 to reset the system (e.g., reset the light curtain and/or Estop), and user input 466 to initiate the camera calibration.

In this example, upon completion of the "Robot App Checks", an option is displayed to "Launch Dashboard" (as shown FIG. 4R) via button 468, selection of which causes the controller to configure the user interface shown in FIG. 4S, and result in display of a dashboard such as dashboard 475 comprised in the user interface shown in FIG. 4T. In some embodiments, dashboard 475 comprises statistics information, such as a pick per hour (PPH) 476, a total pick count 478, an average pallet height 480, and/or an intervention rate 482. Additionally, or alternatively, dashboard 475 comprises robot specific statistics 484, such as in the case that the robotic system comprises a plurality of robots.

In various embodiments, once the containerized robotic system has been unpacked, assembled, deployed, and configured as described herein, the system is ready to begin operation, e.g., as shown in FIG. 1F.

In various embodiments, the combination of using modular components, each of which is compact or can be shipped in a compact and easily extended/assembled configuration, with software to perform highly automated safety tests, camera calibration, and operational tests, as disclosed herein, enables a system to be deployed, configured, calibrated, tested, and otherwise made ready to perform operations in a fraction of the time typically required to deploy a system with the same capabilities.

Figure 5:
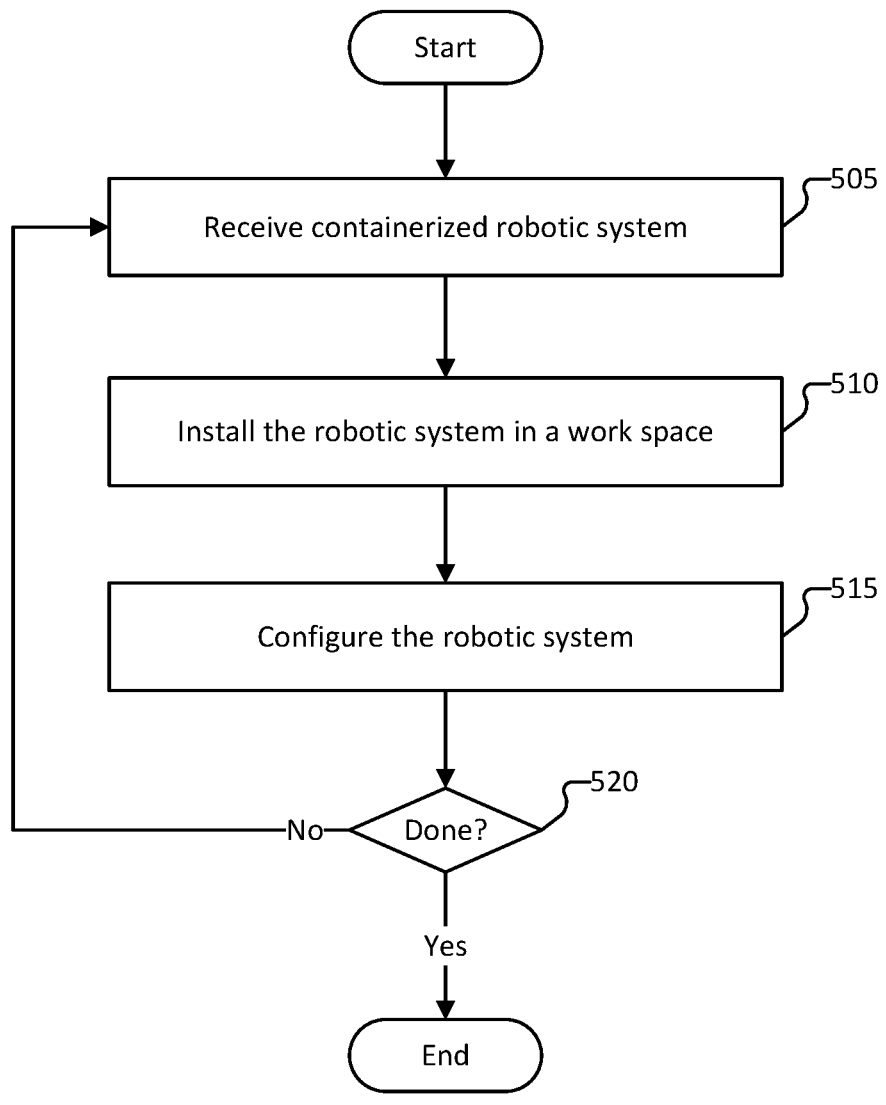
FIG. 5 is a flow chart illustrating a process for deploying a containerized robotic system according to various embodiments.

FIG. 5 is a flow chart illustrating a process for deploying a containerized robotic system according to various embodiments.

At 505, a containerized robotic system is received. At 510, the robotic system is installed in a work space. At 515, the robotic system is configured. In some embodiments, in connection with configuring the robotic system, process 500 invokes process 600 of FIG. 6, process 700 of FIG. 7, process 800 of FIG. 8, process 900 of FIG. 9, and/or process 1000 of FIG. 10. At 520, a determination is made as to whether process 500 is complete. In some embodiments, process 500 is determined to be complete in response to a determination that no further robotic systems are to be deployed or configured, that the robotic system being deployed is configured, an administrator or other user indicates that process 500 is to be paused or stopped, etc. In response to a determination that process 500 is complete, process 500 ends. In response to a determination that process 500 is not complete, process 500 returns to 505.

Figure 6:
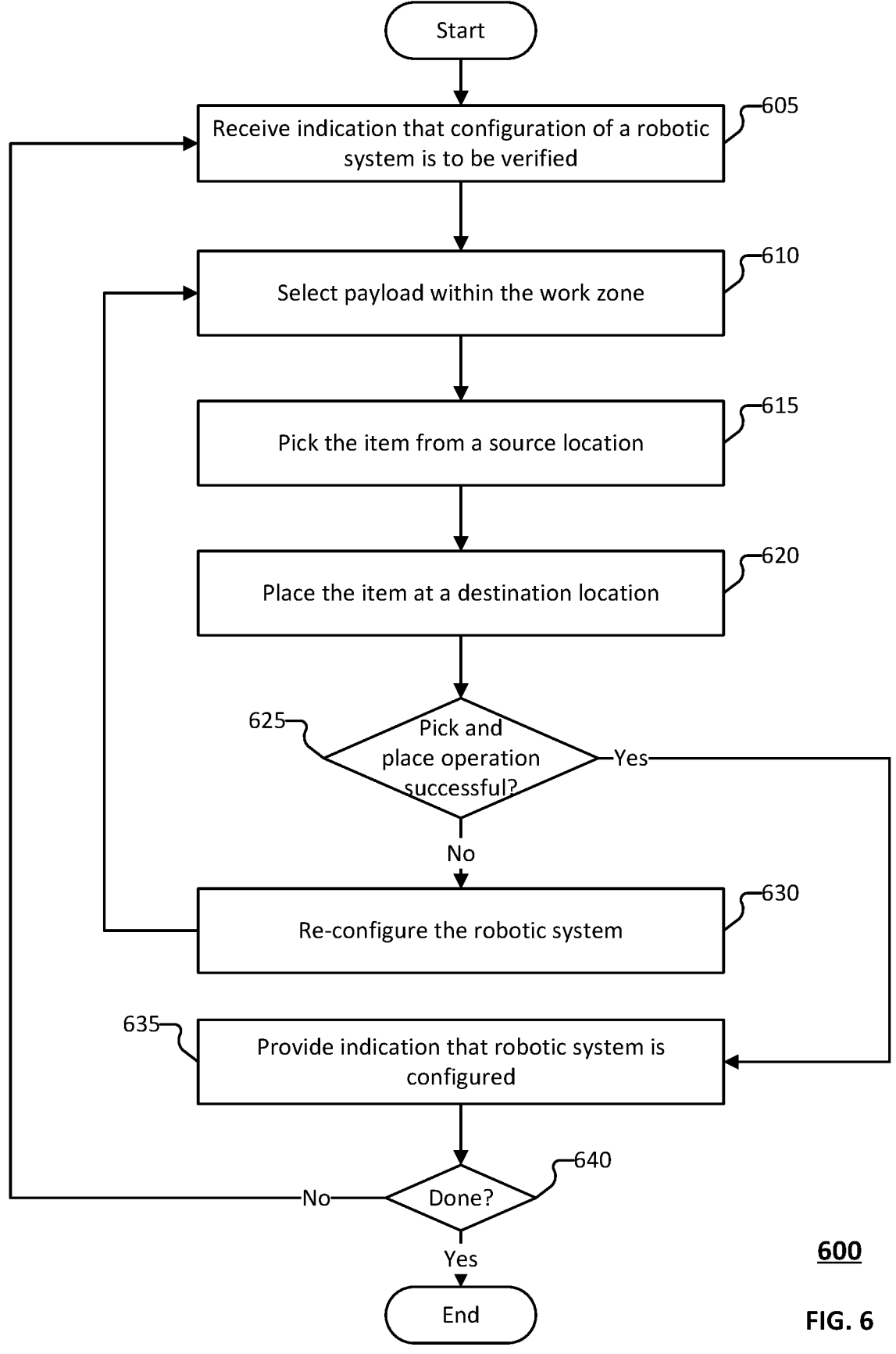
FIG. 6 is a flow chart illustrating a process for configuring a deployed robotic system according to various embodiments.

FIG. 6 is a flow chart illustrating a process for configuring a deployed robotic system according to various embodiments. In some embodiments, process 600 is invoked by process 500, such as at 515.

At 605, the system receives an indication that a configuration of a robotic system is to be verified. The indication may be received from the system or service performing process 515 of process 500. At 610, the system selects a payload within the work zone. At 615, the system picks the payload from a source location. At 620, the system places the payload at a destination location. At 625, the system determines whether the pick and place operation are successful. In some embodiments, the system invokes process 700 in connection with verifying the pick and place operation, such as to verify a configuration of the robotic system. In response to determining that that the pick and place operation is successful at 625, process 600 proceeds to 635. Conversely, in response to determining that the pick and place operation is not successful at 625, process 600 proceeds to 630 at which the system reconfigures the robotic system. After reconfiguring the robotic system, process 600 returns to 610 and process 600 iterates over 610-625 until the pick and place operation is deemed successful. At 635, the system provides an indication that the robotic system is configured. At 630, a determination is made as to whether process 600 is complete. In some embodiments, process 600 is determined to be complete in response to a determination that no further robotic systems are to be deployed or configured, that the robotic system being deployed is configured, an administrator or other user indicates that process 600 is to be paused or stopped, etc. In response to a determination that process 600 is complete, process 600 ends. In response to a determination that process 600 is not complete, process 600 returns to 605.

Figure 7:
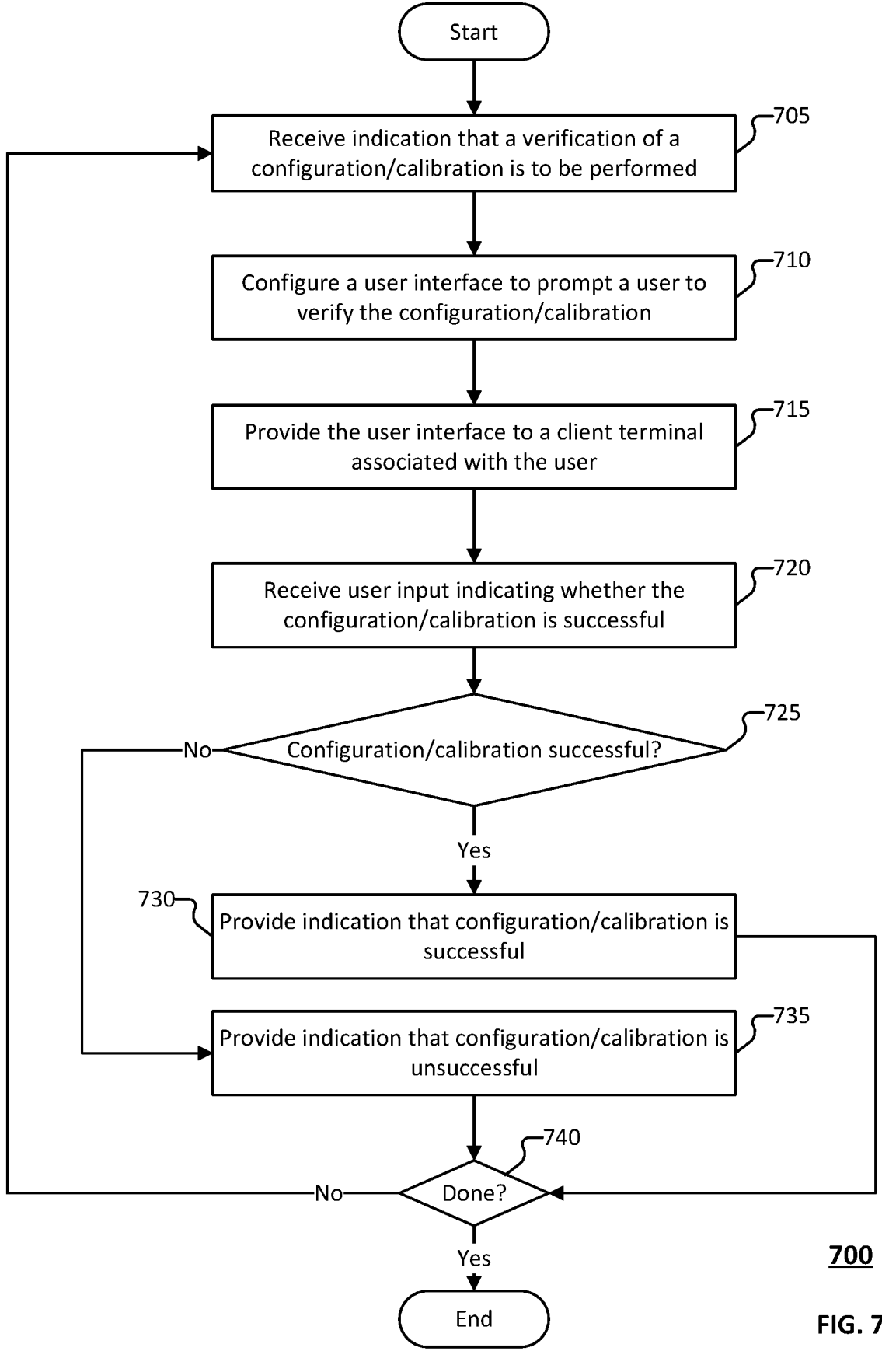
FIG. 7 is a flow chart illustrating a process for prompting a user to verify a configuration or calibration of a robotic system according to various embodiments.

FIG. 7 is a flow chart illustrating a process for prompting a user to verify a configuration or calibration of a robotic system according to various embodiments. In some embodiments, process 700 is invoked by process 500, such as at 515.

At 705, the system receives an indication that a verification of a configuration or calibration of a robotic system is to be performed.

At 710, the system configures a user interface to prompt a user to verify the configuration or calibration of the robotic system. In some embodiments, the prompt provides instructions for the user to follow to verify the configuration/ calibration. For example, the user interface provides a wizard workflow for the user to follow in order to verify the configuration/calibration.

At 715, the system provides the user interface to a client terminal associated with the user. In other embodiments, the robotic system comprises a display unit and the system (e.g., the control system for the robotic system) causes the display unit to provide the user interface.

At 720, the system receives user input indicating whether the configuration/calibration is successful.

At 725, the system determines whether the configuration/calibration is successful. For example, the system determines whether the configuration/calibration is successful based at least in part on the user input.

In response to determining that the configuration/calibration is successful, process 700 proceeds to 730 at which the system provides an indication that the configuration/calibration is successful. Conversely, in response to determining that the configuration/calibration is not successful, process 700 proceeds to 735 at which the system provides an indication that the configuration/calibration is not successful. In some embodiments, the system provides the indication(s) of whether the configuration/calibration is successful to the system or service that invoked process 700. Additionally, or alternatively, the system provides the indication to the user, such as via the user interface.

At 740, a determination is made as to whether process 700 is complete. In some embodiments, process 700 is determined to be complete in response to a determination that no further robotic systems are to be deployed or configured, no further verifications of a configuration/calibration of a robotic system are to be performed, that the robotic system being deployed is successfully configured, an administrator or other user indicates that process 700 is to be paused or stopped, etc. In response to a determination that process 700 is complete, process 700 ends. In response to a determination that process 700 is not complete, process 700 returns to 705.

Figure 8:
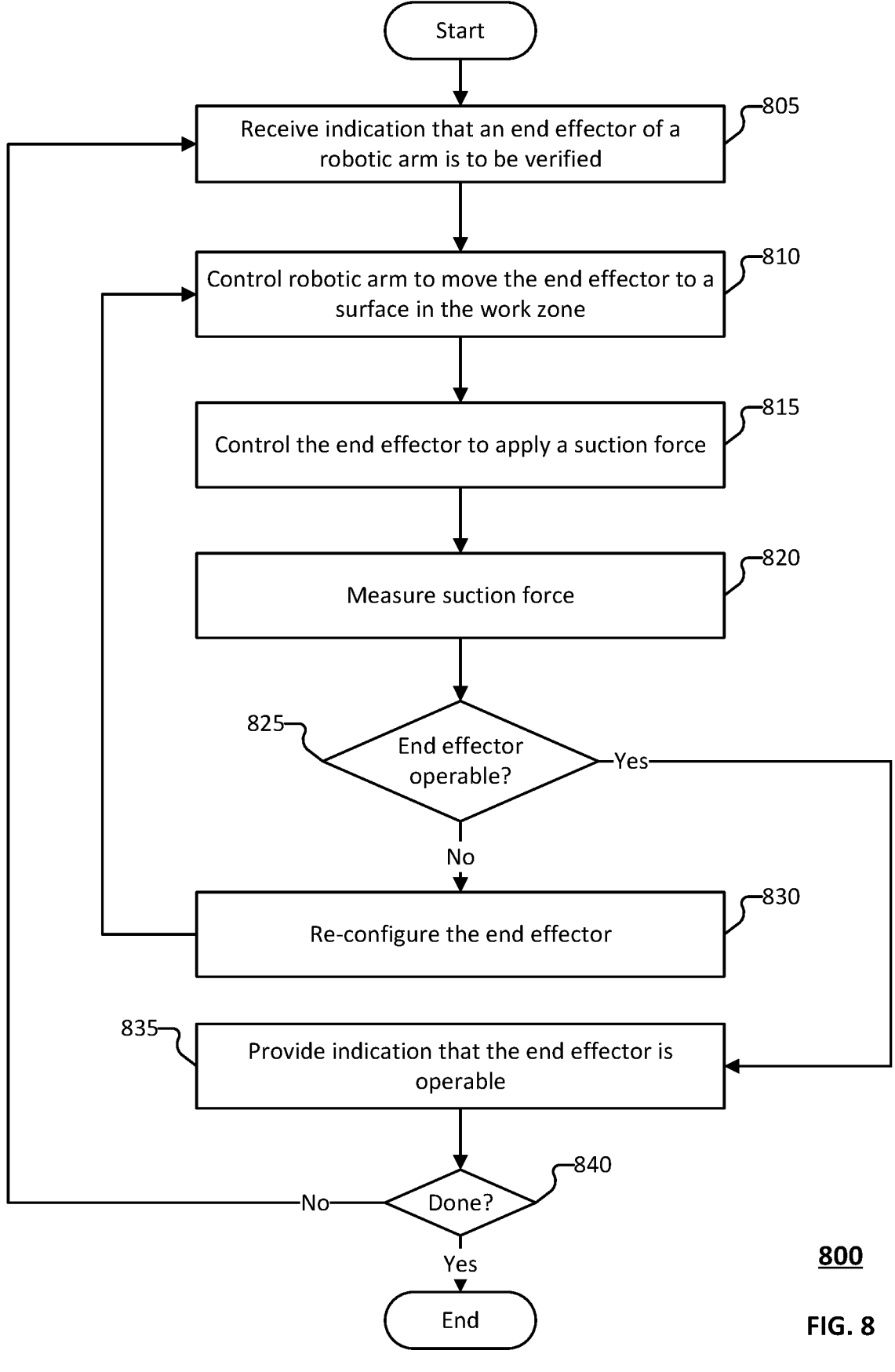
FIG. 8 is a flow chart illustrating a process for verifying calibration of an end effector on a robotic arm according to various embodiments.

FIG. 8 is a flow chart illustrating a process for verifying calibration of an end effector on a robotic arm according to various embodiments. In some embodiments, process 800 is invoked by process 500, such as at 515.

At 805, the system receives an indication that an end effector of a robotic arm is to be verified. For example, the system receives an indication that a verification of a configuration of the end effector is to be performed.

At 810, the system causes the robotic arm to move the end effector to a surface in the work zone. In some embodiments, the surface corresponds to a predefined surface in the work zone. Examples of the predefined surface include the base to which the robotic arm is mounted, a table or other flat surface in the work zone, an item in the work zone, or another object in the work zone. In some embodiments, the surface is dynamically selected, such as based on a configuration or state of the configuration of the robotic system.

At 815, the system controls the end effector to apply a suction force.

At 820, the system measures the suction force.

At 825, the system determines whether the end effector is operable. In some embodiments, determining whether the end effector is operable includes determining whether the end effector is properly configured or calibrated. The system may determine whether the end effector based at least in part on the suction force. In some embodiments, process 800 invokes process 700 in connection with determining whether the end effector is operable.

In response to determining that the end effector is not operable, process 800 proceeds to 830 at which the system reconfigures the end effector. Thereafter, process 800 proceeds to 810 and process 800 iterates over 810-825 until the system deems the end effector to be operable. Conversely, in response determining that the end effector is operable, process 800 proceeds to 835 at which the system provides an indication that the end effector is operable. In some embodiments, the system provides the indication that the end effector is operable or properly configured/calibrated to the system or service that invoked process 800. Additionally, or alternatively, the system provides the indication to the user, such as via the user interface.

At 840, a determination is made as to whether process 800 is complete. In some embodiments, process 800 is determined to be complete in response to a determination that no further robotic systems are to be deployed or configured, no further end effectors are to be configured or calibrated, that the robotic system being deployed is successfully configured, an administrator or other user indicates that process 800 is to be paused or stopped, etc. In response to a determination that process 800 is complete, process 800 ends. In response to a determination that process 800 is not complete, process 800 returns to 805.

Although process 800 is described in connection with verifying whether a suction-based end effector is operable, in various other embodiments, a similar process may be invoked to verify whether other types of end effectors are operable (e.g., a gripper, a hand, etc.).

Figure 9:
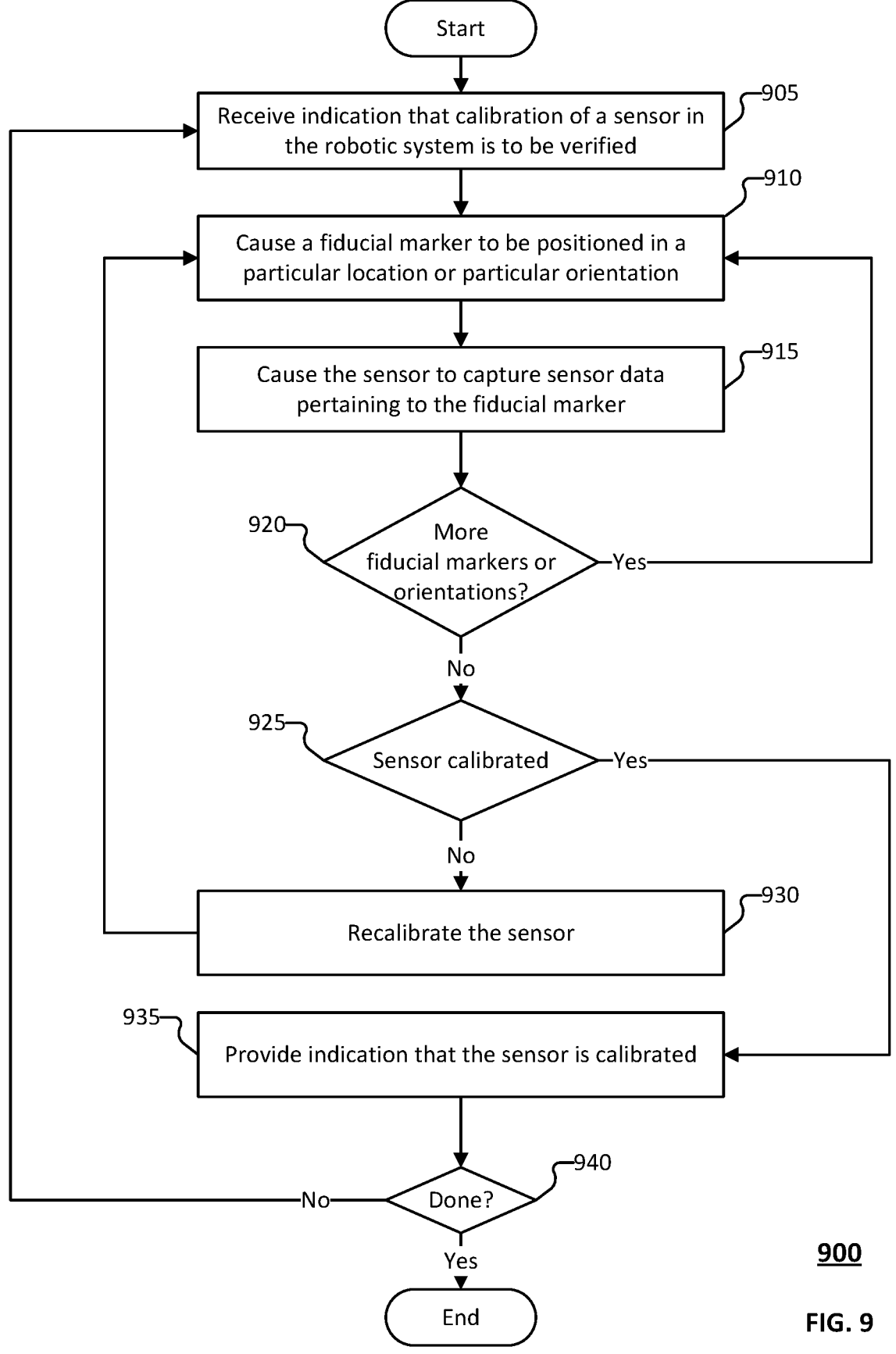
FIG. 9 is a flow chart illustrating a process for verifying calibration of a sensor in a robotic system according to various embodiments.

FIG. 9 is a flow chart illustrating a process for verifying calibration of a sensor in a robotic system according to various embodiments. In some embodiments, process 900 is invoked by process 500, such as at 515.

At 905, the system receives an indication that calibration of a sensor in the robotic system is to be verified.

At 910, the system causes a fiducial marker to be positioned in a particular location or particular orientation. In some embodiments, causing the fiducial marker to be positioned in the particular location/orientation comprises prompting a user, via a user interface, to position/place the fiducial marker (e.g., in the work zone). In some embodiments, causing the fiducial marker to be positioned in the particular location/orientation comprises moving the robotic arm to move through different locations (e.g., predefined locations) within the work zone or through a set of predefined poses to expose a fiducial marker on the robot or robotic arm to the sensor (e.g., at a set of predefined orientations or perspectives). The system may control the robotic arm to move through the set of locations or set of predefined poses to expose the fiducial marker to the sensor in a plurality of orientations.

At 915, the system causes the sensor to capture sensor data pertaining to the fiducial marker. In some embodiments, the sensor data comprises an image of the fiducial marker. Although process 900 describes 910 and 915 as different steps, the features of 910 and 915 may be combined in a single step to perform the positioning of the fiducial marker contemporaneous with the capturing of the image of the fiducial marker.

At 920, the system determines whether additional fiducial markers are to be positioned in the work zone and/or whether the fiducial marker is to be positioned in different orientations.

In response to determining that additional fiducial markers are to be positioned in the work zone and/or that the fiducial marker is to be positioned in different orientations, process 900 returns to 910 and process 900 iterates over

910-920 until no further fiducial markers are to be positioned or no further orientations of the fiducial marker are to be captured. Conversely, in response to determining that no further fiducial markers are to be positioned or no further orientations of the fiducial marker are to be captured, process 900 proceeds to 925.

At 925, the system determines whether the sensor is calibrated. In some embodiments, the system determines whether the sensor is calibrated based at least in part on the sensor data. For example, the system determines whether the sensor is calibrated based on a determination that a fiducial marker representation(s) extracted from the sensor data matches an expected fiducial marker representations, such as images of the fiducial marker from a set of predefined perspectives or in a set of predefined orientations. In some embodiments, process 900 invokes process 700 in connection with determining whether the sensor is calibrated.

In response to determining that the sensor is not calibrated, process 900 proceeds to 930 at which the system recalibrates the sensor. Process 900 then proceeds to 910 and iterates over 910-925 until the system deems the sensor to be calibrated. Conversely, in response to determining that the sensor is calibrated, process 900 proceeds to 935 at which the system provides an indication that the sensor is calibrated. In some embodiments, the system provides the indication that the sensor is calibrated to the system or service that invoked process 900. Additionally, or alternatively, the system provides the indication to the user, such as via the user interface.

At 940, a determination is made as to whether process 900 is complete. In some embodiments, process 900 is determined to be complete in response to a determination that no further robotic systems are to be deployed or configured, no further sensors are to be configured or calibrated, that the robotic system being deployed is successfully configured, an administrator or other user indicates that process 900 is to be paused or stopped, etc. In response to a determination that process 900 is complete, process 900 ends. In response to a determination that process 900 is not complete, process 900 returns to 905.

Figure 10:
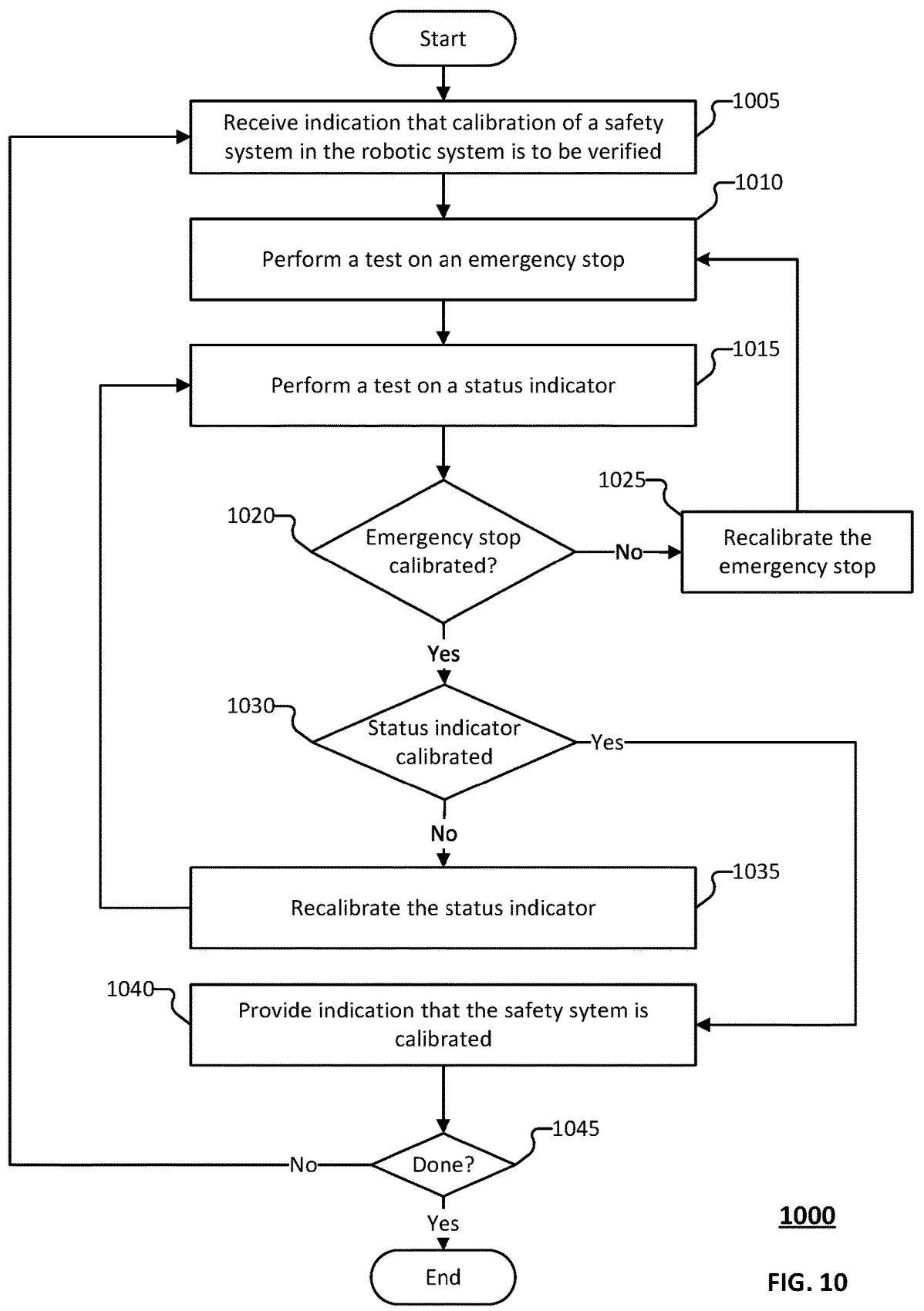
FIG. 10 is a flow chart illustrating a process for verifying calibration or configuration of a safety system for a robotic system according to various embodiments.

FIG. 10 is a flow chart illustrating a process for verifying calibration or configuration of a safety system for a robotic system according to various embodiments. In some embodiments, process 1000 is invoked by process 500, such as at 515.

At 1005, the system receives an indication that a calibration of a safety system in the robotic system is to be verified.

At 1010, the system performs a test on an emergency stop. The emergency stop is comprised in the safety system for the deployed robotic system. In some embodiments, the system executes application code to control the robotic arm and to activate the emergency stop to assess whether the activation of the emergency stop caused the robotic system to stop/pause. In some embodiments, the performing the test on the emergency stop includes verifying a resetting of an emergency stop and a set of one or more status lights.

In some embodiments, performing the test on the emergency stop comprises verifying operation of a light curtain. The verifying the operation of the light curtain comprises prompting a user, via a user interface, to cross the light curtain to verify that the robotic system stops operation and that a status indicator is correspondingly set.

At 1015, the system performs a test on a status indicator. In some embodiments, performing the test on the status indicator comprises verifying an operation of a set of one or more status lights. For example, the system determines whether a status indicator is triggered (e.g., a particular light is turned on) when the emergency stop is activated (e.g., determine whether a red light in or around the robotic system is activated), or whether a different status indicator is triggered when the emergency stop is reset and the robotic system is configured in a normal operation state (e.g., determine whether a green light in or around the robotic system is activated).

At 1020, the system determines whether the emergency stop is calibrated. In response to determining that the emergency stop is not calibrated, process 1000 proceeds to 1025 at which the system recalibrates the emergency stop. Thereafter, process 1000 iterates over 1010-1020 until the system determines that the emergency stop is calibrated.

Conversely, in response to determining that the emergency stop is calibrated, process 1000 proceeds to 1030 at which the system determines whether the status indicator is calibrated. In response to determining that the status indicator is not calibrated, process 1000 proceeds to 1035 at which the system recalibrates the status indicator. Thereafter, process 1000 returns to 1015 (or 1010) and process iterates over 1015-1030 until the system determines that the status indicator is calibrated. In response to determining that the status indicator is calibrated, process 1000 proceeds to 1040 at which the system provides an indication that the safety system is calibrated. In some embodiments, the system provides the indication that the safety system is calibrated to the system or service that invoked process 1000. Additionally, or alternatively, the system provides the indication to the user, such as via the user interface.

At 1045, a determination is made as to whether process 1000 is complete. In some embodiments, process 1000 is determined to be complete in response to a determination that no further robotic systems are to be deployed or configured, no further safety systems are to be configured or calibrated, that the robotic system being deployed is successfully configured, an administrator or other user indicates that process 1000 is to be paused or stopped, etc. In response to a determination that process 1000 is complete, process 1000 ends. In response to a determination that process 1000 is not complete, process 1000 returns to 1005.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic system, comprising:
   a robotic arm positioned in a known location adjacent to a work zone with respect to which the robotic arm is configured to manipulate one or more items;
   one or more sensors each positioned in a corresponding fixed location relative to the work zone; and
   one or more processors configured to configure the robotic system to use the robotic arm to manipulate the one or more items, the robotic system being configured based at least in part on real-time sensor data, the real-time sensor data comprising information indicative of a relative position of the robotic arm and one or more other objects in the work zone,
   wherein configuring the robotic system further comprises;

selecting or modifying an application routine based on a spatial layout of one or more objects in the work zone, the spatial layout of one or more objects in the work zone being identified based at least in part on the real-time sensor data; and
   verifying an operation of a light curtain, wherein the verifying the operation of the light curtain comprises confirming that status indicator is correspondingly set in response to determination that the light curtain detects a user.

2. The robotic system of claim 1, wherein the known location is a fixed location.

3. The robotic system of claim 2, wherein the known location corresponds to a fixed base of a stationary robot to which the robotic arm is attached.

4. The robotic system of claim 1, wherein the known location is a default location of a non-stationary robot to which the robotic arm is attached.

5. The robotic system of claim 4, wherein the default location of the non- stationary robot is an end of a rail to which the non-stationary robot is mounted and traverses to move within the work zone.

6. The robotic system of claim 1, wherein manipulating the one or more items comprises performing a pick and place operation.

7. Therein the robotic system of claim 6, wherein the pick and place operation comprises moving at least one item of the one or more items to/from a pallet within the work zone.

8. The robotic system of claim 1, wherein manipulating the one or more items comprises picking the item from a source location within the work zone.

9. The robotic system of claim 1, wherein manipulating the one or more items comprises placing the item to a destination location within the work zone.

10. The robotic system of claim 1, wherein configuring the robotic system includes testing an application code to pick or place a payload within the work zone.

11. The robotic system of claim 10, wherein the testing the application comprises:
    placing a payload in a particular location in the work zone; and
    prompting, via a user interface, a user to verify that the robotic arm successfully placed the payload at the particular location.

12. The robotic system of claim 10, wherein the testing of the application code comprises prompting a user, via a user interface, to verify that the robotic arm successfully picked the payload and placed the payload at a particular location in the work zone.

13. The robotic system of claim 1, wherein configuring the robotic system includes testing an operation of an end effector of the robotic arm.

14. The robotic system of claim 13, wherein the end effector comprises a suction-based gripper, and the testing the operation of the end effector comprises testing a suction of the gripper.

15. The robotic system of claim 1, wherein the one or more sensors comprises a camera or other image sensor.

16. The robotic system of claim 1, wherein configuring the robotic system comprises calibrating the one or more sensors.

17. The robotic system of claim 16, wherein the calibrating the one or more sensors comprises:
    prompting a user, via a user interface, to place a fiducial marker or pattern of markers in a particular location in the work zone.

18. The robotic system of claim 16, wherein the calibrating the one or more sensors comprises:

automatically controlling the robotic arm to move through poses to expose to at least one of the one or more sensors a fiducial marker on the robotic arm or robot to which the robotic arm is attached.

19. The robotic system of claim 18, wherein the robotic arm is controlled to move through poses exposes the fiducial marker at a set of predefined angles with respect to at least one of the one or more sensors.

20. The robotic system of claim 1, wherein configuring the robotic system comprises configuring a safety system.

21. The robotic system of claim 20, wherein the configuring the safety system comprises verifying an operation of an emergency stop and a set of one or more status lights.

22. The robotic system of claim 20, wherein the configuring the safety system comprises verifying a resetting of an emergency stop and a set of one or more status lights.

23. The robotic system of claim 20, wherein the configuring the safety system comprises verifying an operation of a light curtain.

24. The robotic system of claim 23, wherein the verifying the operation of the light curtain comprises prompting a user, via a user interface, to cross the light curtain to verify that the robotic system stops operation and that a status indicator is correspondingly set.

25. The robotic system of claim 1, wherein the robotic system is built from a plurality of modular components, and each of the plurality of components is sufficiently small or foldable to a smaller size so that all the modular components fit in a standard shipping container.

26. A method, comprising:

automatically configuring a robotic system to use a robotic arm to manipulate one or more items, the robotic system being configured based at least in part on real-time sensor data, the real-time sensor data comprising information indicative of a relative position of the robotic arm and one or more other objects in the work zone, wherein configuring the robotic system further comprises;

selecting or modifying an application routine based on a spatial layout of one or more objects in the work zone, the spatial layout of one or more objects in the work zone being identified based at least in part on the real-time sensor data; and verifying an operation of a light curtain, wherein the verifying the operation of the light curtain comprises confirming that status indicator is correspondingly set in response to determination that the light curtain detects a user.

27. A computer program product embodied in a non-transitory computer readable medium and comprising computer instructions for:

automatically configuring a robotic system to use a robotic arm to manipulate one or more items, the robotic system being configured based at least in part on real-time sensor data, the real-time sensor data comprising information indicative of a relative position of the robotic arm and one or more other objects in the work zone, wherein configuring the robotic system further comprises;

selecting or modifying an application routine based on a spatial layout of one or more objects in the work zone, the spatial layout of one or more objects in the work zone being identified based at least in part on the real-time sensor data; and verifying an operation of a light curtain, wherein the verifying the operation of the light curtain comprises confirming that status indicator is correspondingly set in response to determination that the light curtain detects a user.

28. A robotic system, comprising:

a robotic arm positioned in a known location adjacent to a work zone with respect to which the robotic arm is configured to manipulate one or more items;

one or more sensors each positioned in a corresponding fixed location relative to the work zone; and one or more processors configured to configure the robotic system to use the robotic arm to manipulate the one or more items, the robotic system being configured based at least in part on sensor data, the sensor data comprising information indicative of a relative position of the robotic arm and one or more other objects in the work zone;

wherein configuring the robotic system comprises:

configuring a safety system; and verifying an operation of a light curtain, wherein the verifying the operation of the light curtain comprises prompting a user, via a user interface, to cross the light curtain to verify that the robotic system stops operation and that a status indicator is correspondingly set.

* * * * *